(12) United States Patent
Kelkar et al.

(10) Patent No.: US 6,646,789 B2
(45) Date of Patent: Nov. 11, 2003

(54) SINGLE PARAMETER GAIN SLOPE ADJUSTER FOR AN OPTICAL SYSTEM

(75) Inventors: Parag V Kelkar, Horseheads, NY (US); Peter G. Wigley, Corning, NY (US); Kai Wundke, Elmira, NY (US)

(73) Assignee: Corning Incorporated, Corning, NY (US)

( * ) Notice: Subject to any disclaimer, the term of this patent is extended or adjusted under 35 U.S.C. 154(b) by 138 days.

(21) Appl. No.: 10/080,756

(22) Filed: Feb. 22, 2002

(65) Prior Publication Data

US 2002/0159135 A1 Oct. 31, 2002

Related U.S. Application Data

(63) Continuation-in-part of application No. 09/809,882, filed on Mar. 16, 2001.

(51) Int. Cl.[7] ............................................. H04B 10/12
(52) U.S. Cl. ................. 359/337.1; 359/337.2; 359/337.22
(58) Field of Search ........................ 359/373.2, 337.21, 359/337.22, 337.4, 510, 337.1, 337

(56) References Cited

U.S. PATENT DOCUMENTS

| | | | |
|---|---|---|---|
| 5,596,661 A | * 1/1997 | Henry et al. | 385/24 |
| 5,615,037 A | * 3/1997 | Betts et al. | 359/173 |
| 5,963,361 A | * 10/1999 | Taylor et al. | 359/161 |
| 6,055,094 A | * 4/2000 | Shima et al. | 359/124 |
| 6,134,047 A | * 10/2000 | Flood et al. | 359/174 |
| 6,215,584 B1 | * 4/2001 | Yang et al. | 359/124 |
| 6,268,954 B1 | 7/2001 | Cheng | 359/337 |
| 6,359,726 B1 | * 3/2002 | Onaka et al. | 359/337.1 |

OTHER PUBLICATIONS

Goossen et al. IEEE Photonics Tech. Letts. vol. 12 No. 7, Jul. 2000.*
Hatayama et al. OFCC '2000 vol. 2 Mar. 7–10, 2000.*
Bruyere et al. IEEE Phot. Tech. Letts. vol. 6 No. 5 May 1994.*
Inoue et al. IEEE Phot. Tech. Letts. vol. 3 No. 8 Aug. 1991.*
Kinoshita et al. Fujitsu Sci. Tech. J. 35, Jul. 1, 1999.*
Goossen et al. LEOS '99 vol. 2 Nov. 8–11, 1999.*
Lenz et al. J. of Light. Tech. vol. 17 No. 7 Jul. 1999.*
Greek et al. J of Microelectromechanical systems vol. 8 No. 3 Sep. 1999.*
Frisken et al. OFCC '2000 vol. 2 Mar. 7–10 2000.*
Becker et al. Erbium Doped Fiber Amplifiers. Academic Press 1999.*
Offrein et al. LEOS '99 vol. 28–11 Nov. 1999.*
Nolan et al. OFC '94 vol. 4 Feb. 20–25, 1994.*
Compensation of L–band Gain–Wavelength Characterustics Using Linear and Second–order Variable Gain Equalizers; T. Naito et al; ©1999.
Ultra–Wide Dynamic Range Erbium Doped Fiber Amplifiers Employing Variable Attenuation Slope Compensator; Kakui et al; pp. 167–169 ©1999.

* cited by examiner

*Primary Examiner*—Thomas G. Black
*Assistant Examiner*—Stephen Cunningham
(74) *Attorney, Agent, or Firm*—Svetlana Z. Short

(57) ABSTRACT

An optical device comprises an optical amplifier to amplify optical signals, optical pumps coupled to and providing optical pump power to least one amplifying stage of the optical amplifier, so as to produce gain in the said optical amplifier and, a tunable optical filter coupled to the optical amplifier. The optical filter changes the gain slope of the optical amplifier in response to a change in a single parameter of the optical filter. The optical amplifier also includes at least one controller adjusting said single parameter of the optical filter and controlling the optical pumps.

29 Claims, 26 Drawing Sheets

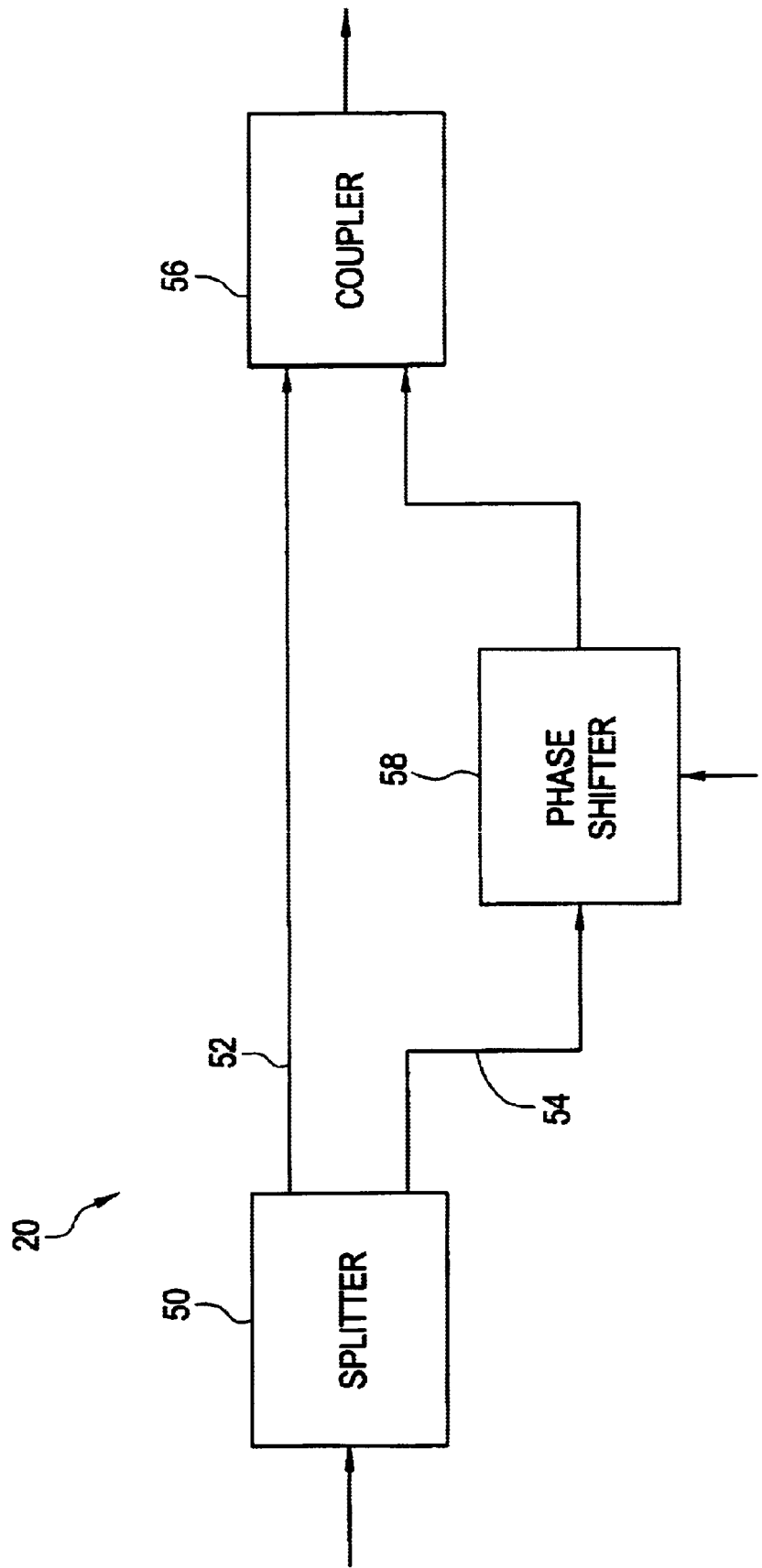

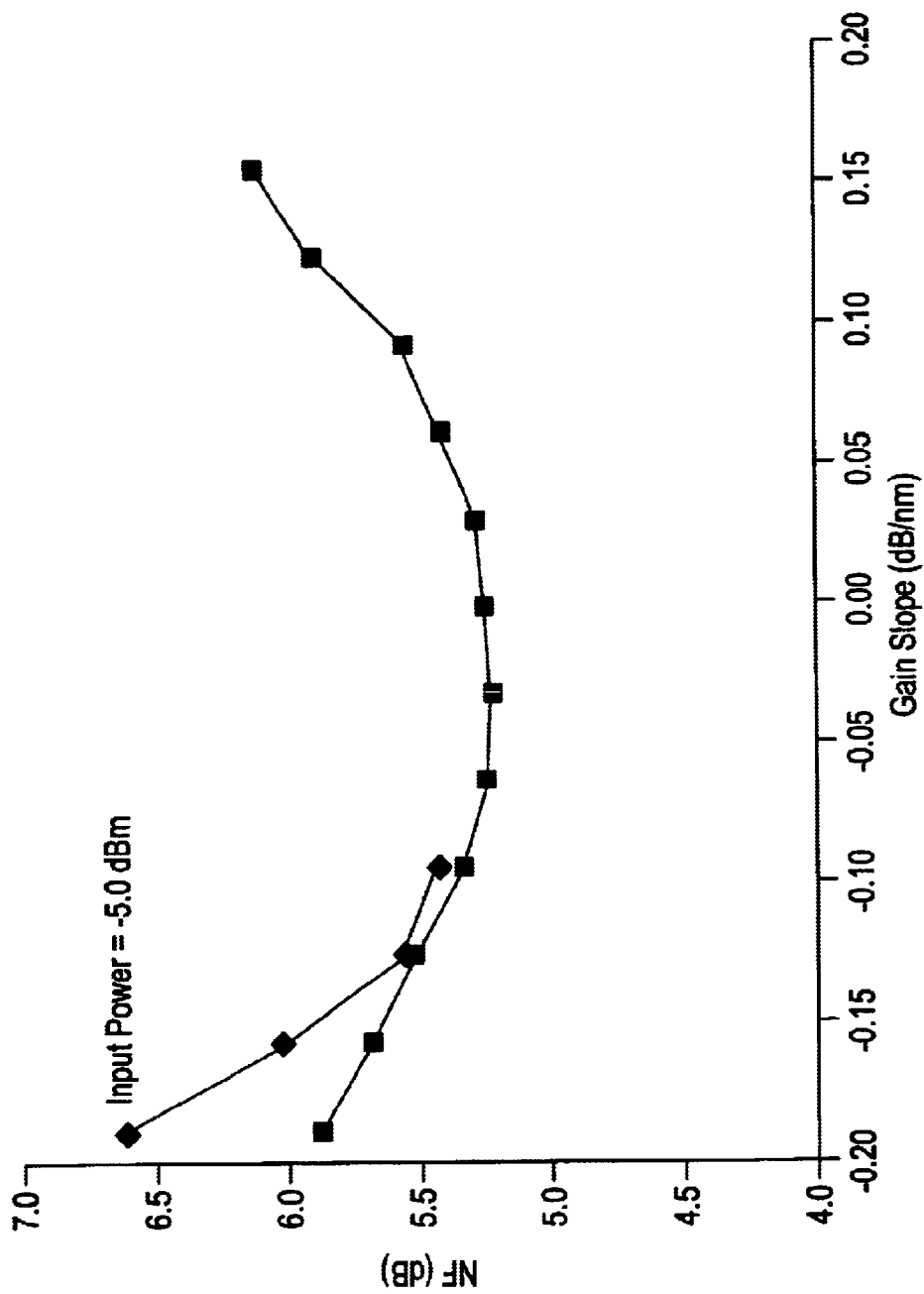

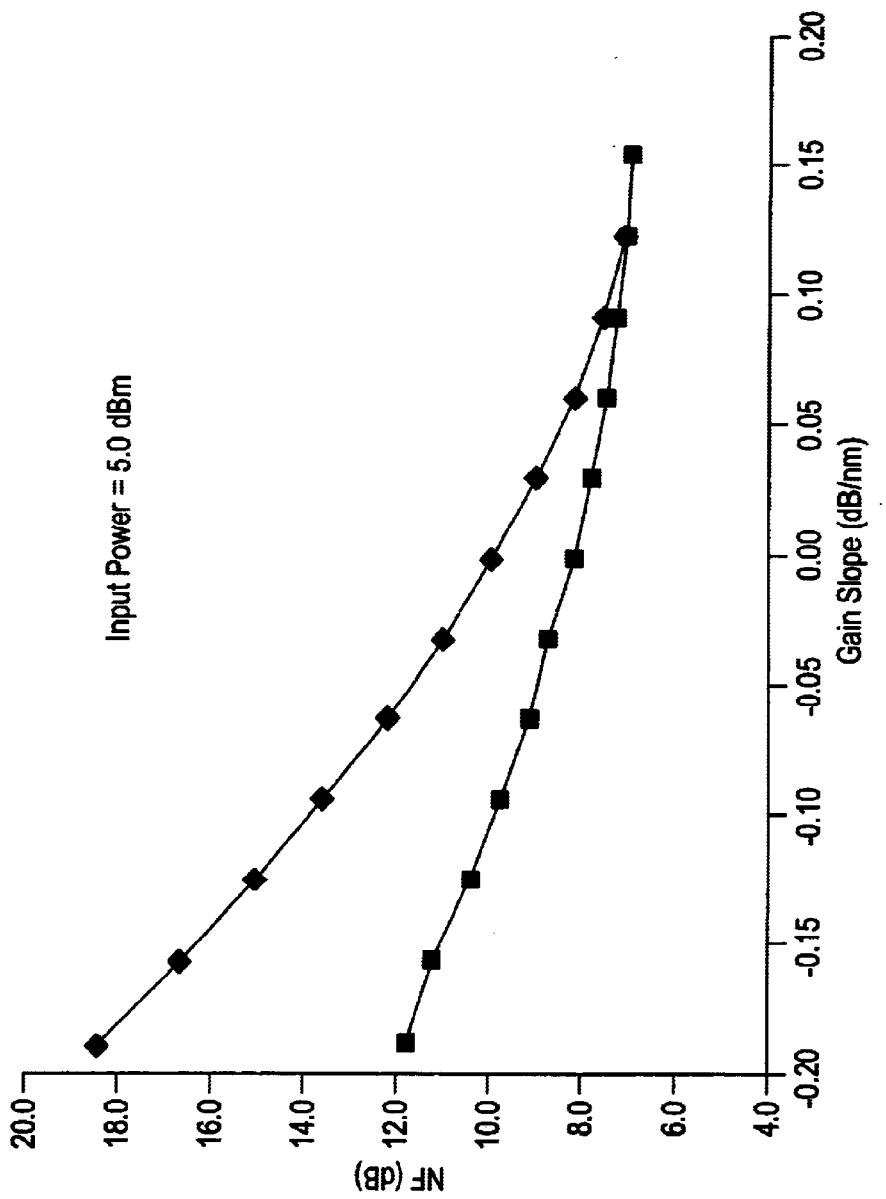

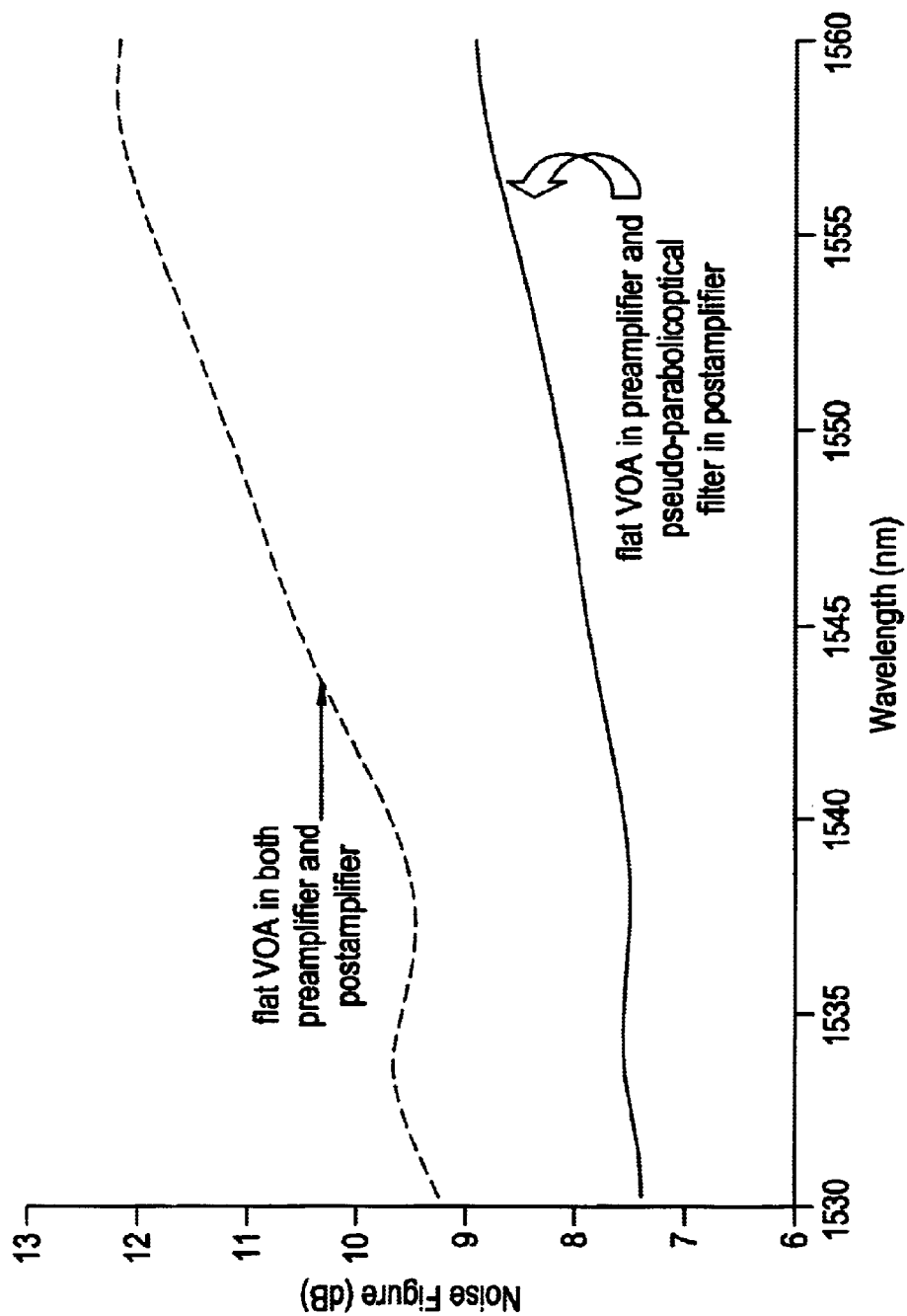

SINGLE PARAMETER GAIN SLOPE ADJUSTER FOR AN OPTICAL SYSTEM

CROSS-REFERENCE TO RELATED APPLICATIONS

This application is a continuation-in-part application of Ser. No. 09/809,882, filed Mar. 16, 2001, entitled "Single Parameter Gain Slope Adjuster", by Peter Wigley and Kai Wundke, the disclosure of which is hereby incorporated by reference.

BACKGROUND OF THE INVENTION

1. Field of the Invention

The present invention generally relates to an optical transmission system and, more particularly, relates to optical filters for accomplishing a change of the gain characteristics of an optical amplifier over an operating wavelength band.

2. Technical Background

In an optical network, optical signals are typically transmitted through a fiber over relatively long distances. Because the strength of the optical signals tends to decrease with increasing transmission path length, it has become commonplace to divide the fibers into spans, with in-line optical amplifiers positioned between the spans. The typical span is, for example, 80–120 km in length. While the in-line optical amplifiers boost the signal strength of the transmitted optical signals, such optical amplifiers typically do not exhibit flat gain characteristics over the band of wavelengths of the optical signals that are transmitted through the optical amplifier. Thus, in an optical network, if each of the optical amplifiers positioned between each fiber span amplify optical signals having certain wavelengths more than they amplify optical signals having other wavelengths, some optical signals will not be amplified sufficiently over a long transmission path and those signals will be more susceptible to errors.

To provide for uniformity of signal amplification at each span of all optical signals transmitted through the network, various techniques have been proposed to flatten the gain of the optical amplifiers so that all the optical signals are amplified the same amount by each optical amplifier provided along a given transmission path. One technique that has been proposed is to provide a gain-flattening dielectric optical filter that has an insertion loss spectrum (also referred to as the "transmission spectrum") that is inversely related to the gain spectrum of the optical amplifier. In other words, the gain-flattening filter will attenuate those wavelengths that are more greatly amplified by the optical amplifier such that the output of the gain-flattened amplifier exhibits a substantially flat and equal gain for all the wavelengths in the wavelength band of interest.

One of the most important parameters of an optical amplifier, such as an erbium doped fiber amplifier (EDFA), is the slope of the optical gain spectrum. Adjustments to the slope of the optical gain spectrum is often required to accommodate a variety of system operating conditions and amplifier characteristics under different input conditions, such as number of signal channels present, span loss variation, Raman Scattering and Raman amplification. The traditional method for achieving slope adjustment is to introduce a variable optical attenuator (VOA) 3 (FIG. 1A) with a spectrally flat response (referred to as a flat VOA), which is placed in between two amplifier gain sections 2a and 2b. When changing the spectrally flat loss of the VOA, the optical signal power (which is coupled from the EDFA gain sections before the VOA to all gain sections following the VOA) changes, thereby affecting the population inversion in those latter stages. This change of the population inversion introduces a change of the gain tilt A, which is defined here as the slope of the best linear fit function $y = A*\lambda + B$ to the spectral shape of the gain. This is illustrated in FIGS. 1B–1D. FIG. 1B shows the input spectrum of the received signals, which is assumed for this example to be flat. FIG. 1C shows the insertion loss spectrum for the VOA for two different states. Both states shown in FIG. 1C have approximately flat loss characteristics across the relevant spectrum. FIG. 1D shows the output gain spectrum of the amplifier for the two different states of the VOA. As apparent from FIG. 1D, a change in the insertion loss spectrum for this VOA results in a gain tilt change in the output gain spectrum. Up to 4 dB of gain tilt change from the maximum gain tilt over 35 nm signal band can be achieved without severe degradation in optical signal to noise ratio (OSNR).

The disadvantage of a flat spectral VOA is that a significant average power loss change is required to achieve a significant gain tilt change. In some cases, 0.5 dB of average power loss change is required to achieve 1 dB of gain tilt change. The large average power loss change of VOA is detrimental in at least two ways. First, average power loss change significantly affects the OSNR of the amplifier, and, second, in order to maintain a constant output power of an EDFA, the pump power would need to be readjusted.

Additionally, the maximum gain tilt A of the EDFA (for constant signal input power) is defined by the minimum loss of the VOA. This also implies that the highest population inversion and therefore the best OSNR occurs always for a maximum gain tilt A.

Recently, new VOA devices have been proposed to circumvent these detrimental effects. The new "slope VOA" device 4 (FIG. 2A) is similarly positioned between amplifier stages 2a and 2b. In these new "slope VOA" devices, which have an approximately linear target spectral response with wavelength, adjustment of the slope of the VOA insertion loss spectrum (FIG. 2C) results in an adjustment of the gain tilt of the amplifier as shown in FIG. 2D.

The mechanism behind the generation of a linear slope change in a "slope VOA" is typically the superposition of two sinusoidal response filters, with a nominal phase difference (center wavelength difference) of 180° (half the free spectral range (FSR)) between them. By adjusting the relative phase and amplitude away from nominal, an approximately linear response can be generated. The advantage of this new "slope VOA" is that the impact on OSNR and pump power readjustment requirements is minimized. This represents an improvement over the flat spectral VOA, but still carries some significant disadvantages. Specifically, these disadvantages include: the linear response is only guaranteed for some maximum phase change, beyond which non-linearity degrades the gain slope changes into a nonlinear gain change; to achieve a certain level of gain slope change, a roughly equal proportion of excess average insertion loss is introduced; and the number of control parameters required to define the attributes of a "slope VOA" is significant, since the amplitude coupling coefficients and phases for each Fourier component in the interferometer typically requires an independent control. Additionally, both VOA devices described above require an additional gain-flattening filter in the amplifier device to achieve a spectrally flat output signal or gain transfer function for at least one VOA setting.

Thus, there exists the need for an improved optical filter that: (1) is responsive to fewer control parameters to change the gain slope of an amplifier with which the filter is used, (2) provides a linear gain change throughout the operating wavelength band; and/or (3) has a lower average power loss.

SUMMARY OF THE INVENTION

An aspect of the present invention is to provide an optical device having an optical input and output. The optical device comprises an optical amplifier to amplify optical signals, optical pumps coupled to and providing optical pump power to least one amplifying stage of the optical amplifier, so as to produce gain in the said optical amplifier and, a tunable optical filter coupled to the optical amplifier. The optical filter changes the gain slope of the optical amplifier in response to a change in a single parameter of the optical filter. The optical amplifier also includes at least one controller adjusting said single parameter of the optical filter and controlling the optical pumps.

According to an embodiment of the present invention the at least one controller includes: a first controller, and a second controller. The said first controller changes gain slope of the amplifier without causing change in the output signal power of the amplifier, by adjusting a single parameter of the said optical filter. The second controller controls the optical pumps and maintains the optical pump power at the specified level. Depending at the level of the optical input signals the first controller unit and the second controller may or may not exchange information.

According to one embodiment of the present invention, the optical amplifier exhibits gain spectrum that varies approximately linearly with respect to wavelength in accordance with a gain slope and the optical filter changes the gain slope of the optical amplifier in response to a change in a central wavelength of the optical filter and.

According to an embodiment of the present invention the optical filter has a pseudo-parabolic spectral filter function. In one embodiment of the invention, the optical filter changes the gain slope of the optical amplifier in response to a change in a central wavelength of the pseudo-parabolic spectral filter function of the optical filter.

According to another embodiment, the single parameter is varied as a function of temperature such that the optical filter compensates for variations in the gain spectrum of the optical amplifier that occur as a function of operating temperature.

According to an embodiment of the present invention an optical amplifier system includes an optical amplifier that amplifies optical signals and a tunable optical filter coupled to the optical amplifier. The optical amplifier exhibits a gain that varies approximately linearly with respect to wavelength in accordance with a gain slope. The optical filter changes the gain slope of the optical amplifier in response to a change in a central wavelength of the optical filter.

Additional features and advantages of the invention will be set forth in the detailed description which follows and will be apparent to those skilled in the art from the description or recognized by practicing the invention as described in the description which follows together with the claims and appended drawings.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description serve to explain the principals and operation of the invention.

BRIEF DESCRIPTION OF THE DRAWINGS

In the drawings:

FIG. 6A is a block diagram of a Mach-Zehnder interferometer that may be implemented as the tunable filter of the present invention;

FIGS. 15A–15C illustrate Noise Figure (NF) performance of two optical amplifiers, for input powers of −5.0 dBm, 0.0 dBm, and 5 dBm, respectively;

FIG. 21A depicts NF versus wavelengths for two optical amplifiers.

DETAILED DESCRIPTION OF THE PREFERRED EMBODIMENTS

Figure 1A:
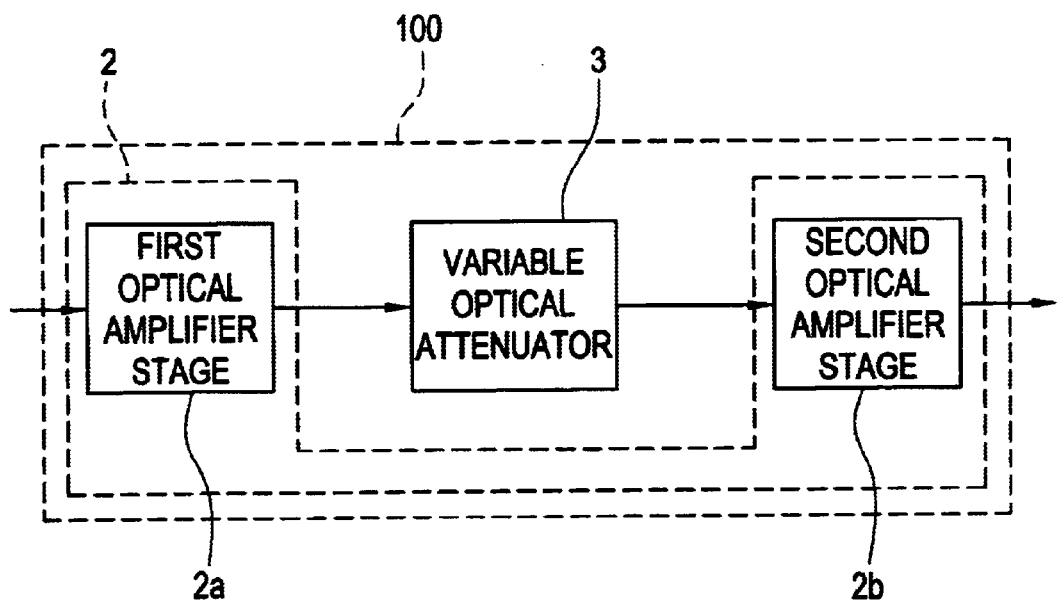
FIG. 1A is a block diagram of a conventional optical amplifier system having a flat spectral VOA.
Figure 2A:
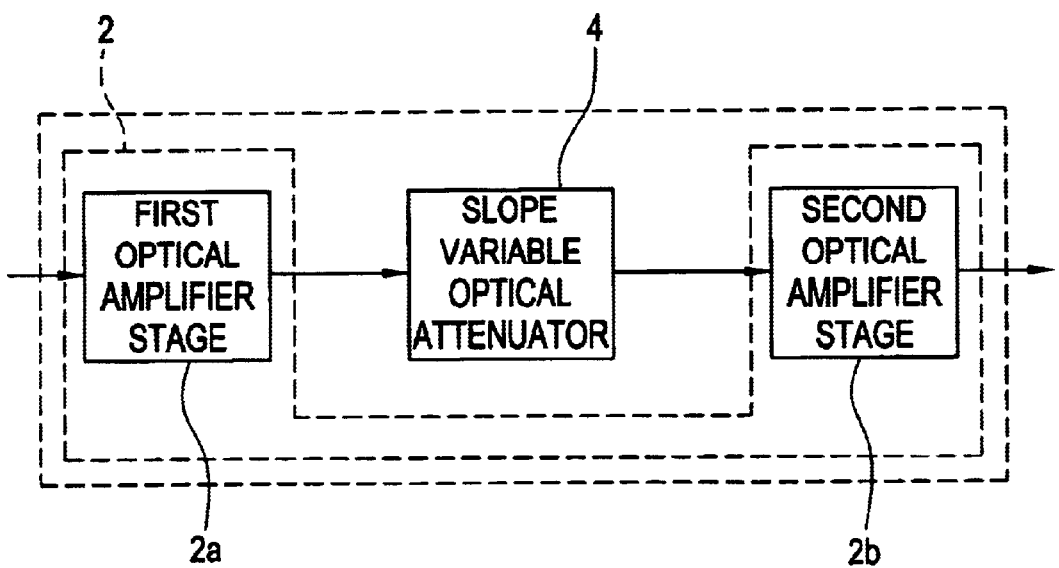
FIG. 2A is a block diagram of a proposed optical amplifier system having a "slope VOA"
Figure 1B:
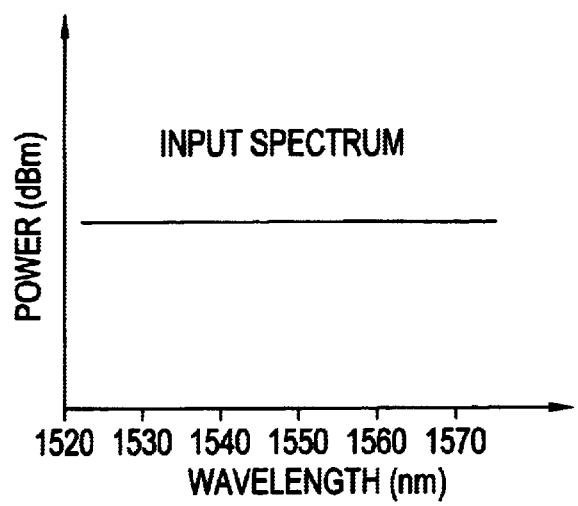
FIG. 1B is a plot of the input signal power as a function of wavelength as input into the conventional optical amplifier system shown in FIG. 1A.
Figure 1C:
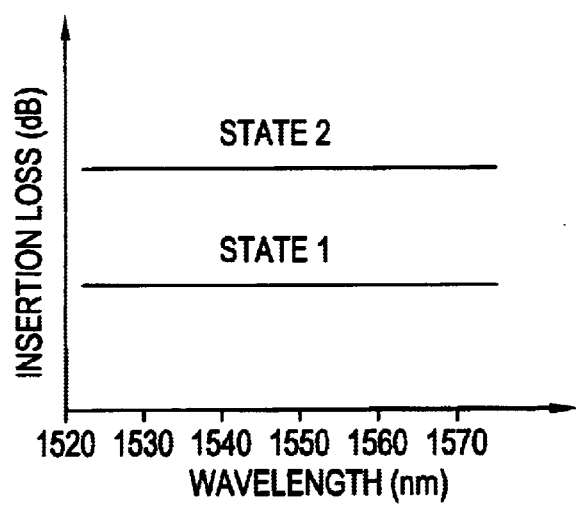
FIG. 1C is a plot of the insertion loss of the conventional VOA of the system shown in FIG. 1A as occurs in two separate states corresponding to an adjustment of the VOA.
Figure 1D:
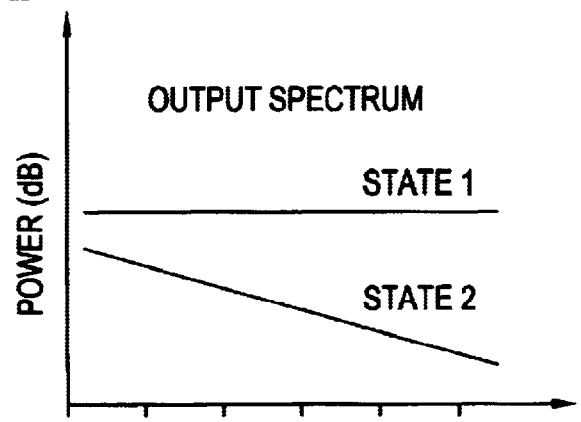
FIG. 1D is a plot of the output power spectrum as a function of wavelength illustrating the gain tilt resulting from the change in states shown in FIG. 1C of the VOA in FIG. 1A.
Figure 2B:
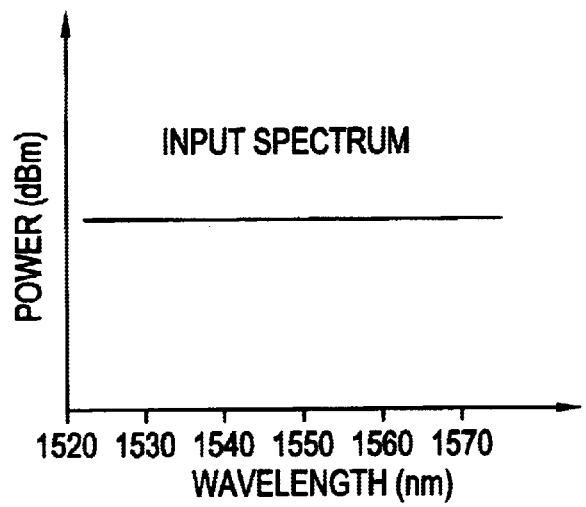
FIG. 2B is a plot of the input signal power as a function of wavelength as input into the optical amplifier system shown in FIG. 2A.
Figure 2C:
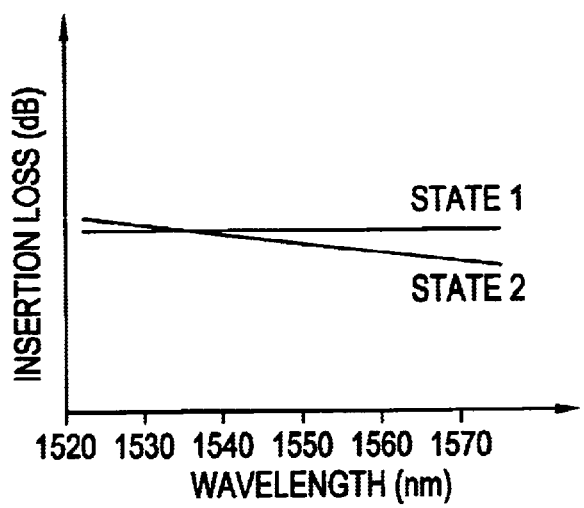
FIG. 2C is a plot of the insertion loss of the VOA of the system shown in FIG. 2A as occurs in two separate states corresponding to an adjustment of the VOA.
Figure 2D:
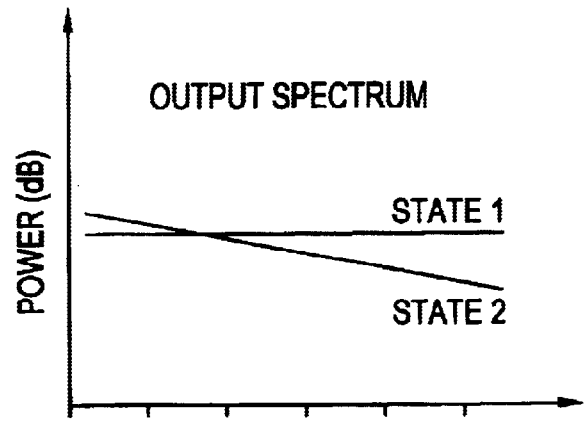
FIG. 2D is a plot of the output power spectrum as a function of wavelength illustrating the gain tilt resulting from the change in states shown in FIG. 2C of the VOA in FIG. 2A.

Reference will now be made in detail to the present preferred embodiment of the invention, an example of which is illustrated in the accompanying drawings. Wherever possible, the same reference numerals will be used throughout the drawings to refer to the same or like parts.

Figure 3:
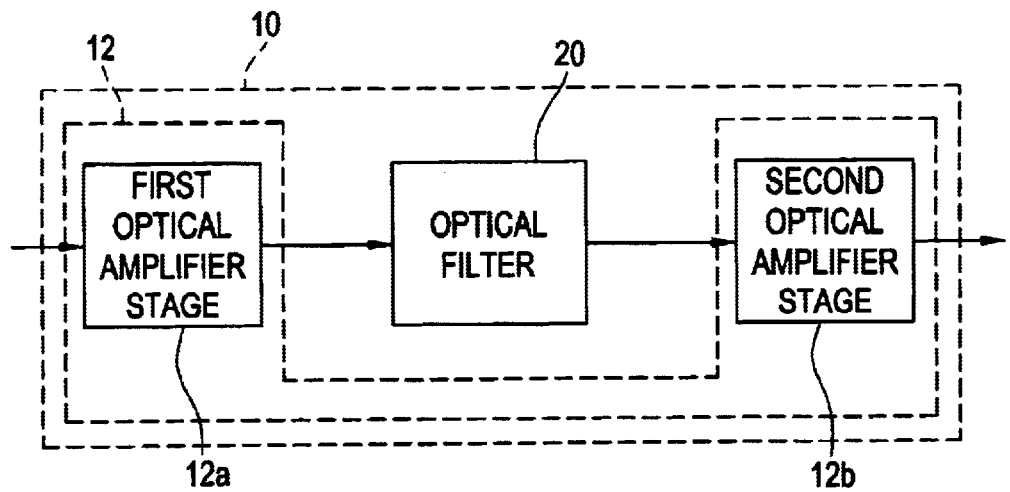
FIG. 3 is a block diagram of an optical amplifier system constructed in accordance with one embodiment of the present invention.

FIG. 3 shows an optical device in the form of an optical amplifier system 10 constructed in accordance with the present invention. As shown, optical amplifier system 10 includes an optical amplifier 12 and an optical filter 20. Optical amplifier 12 includes a first gain stage 12a and a second gain stage 12b, each including an amplifying medium, such as a rare-earth doped fiber coil. Such a coil may, for example, be an Erbium doped fiber of an Erbium doped fiber amplifier (EDFA). Optical filter 20 is preferably coupled between amplifier stages 12a and 12b and preferably includes the novel variable attenuator described below. Although the inventive optical filter is described below for use with a two-stage optical amplifier, it may also be used with an amplifier having more stages, only one stage, or with any other optical device or component.

The present invention exhibits the same advantages of a "slope VOA" and minimizes the average power loss to achieve a certain gain slope change. As noted above, a "slope VOA" is a VOA with a slope that is adjustable. The present invention also reduces the number of control parameters required for the device to a single parameter and is still capable of providing an improvement in gain spectrum linearity spectrum under different input conditions. That is, under different input conditions, compared to the amplifier that utilizes only spectrally flat VOA(s), the amplifier that utilizes an improved optical filter according to present invention has a more linear gain spectrum. The desired gain spectrum linearity is 6% or less and preferably no more than 5%. More preferably the gain spectrum linearity is 4% or better and most preferably no more than 2%. In some of the embodiments the gain spectrum linearity was measured to be about 5%, 3.5% and 2.5%. Gain spectrum linearity is defined as W/G, where W is the peak to peak variation from the best fit line approximation to the optical gain spectrum and G is the average optical gain. In the preferred embodiment described below, the single control parameter that affects the linear gain slope change is the center wavelength of the spectral filter function.

Figure 4A:
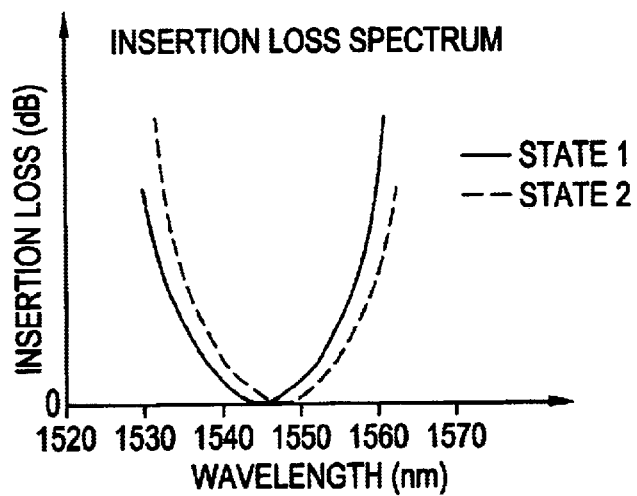
FIG. 4A is a plot of the insertion loss spectrum for the inventive filter used in the embodiment shown in FIG. 3 both with and without a center wavelength shift.
Figure 4B:
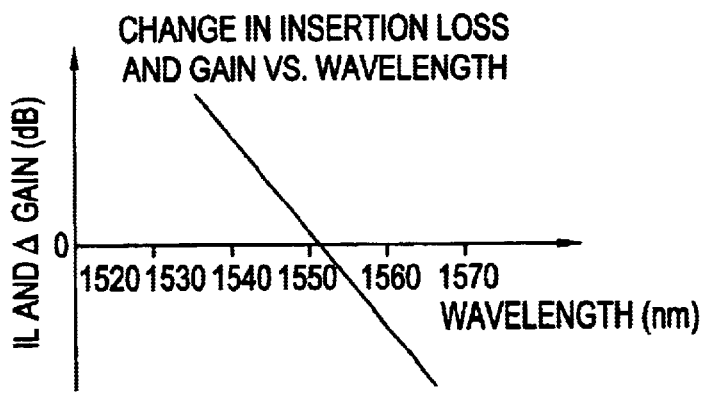
FIG. 4B is a plot of the change in insertion loss and the change in gain as a function of wavelength.

The optical filter 20, according to one embodiment of the present invention, is a tunable filter having an improved spectral filter function (and, thus an improved insertion loss spectrum) of a substantially non-flat spectral shape. In the preferred embodiment, the only parameter of the filter that needs to be adjusted to obtain a desired spectral gain change is the center wavelength, whose tuning range is determined by the required EDFA gain slope change. The filter has a very specific spectral filter function over the EDFA's operating gain bandwidth, plus the desired tuning range. The first derivative of spectral filter function (i.e., the derivative of the insertion loss function) with respect to wavelength ($\Delta L/\Delta \lambda$, where L is spectral filter function or insertion loss) corresponds to, or should closely resemble, the desired spectral gain change required of the amplifier. For example, if a linear spectral gain change is desired (as in the above example of the "slope VOA"), then the ideal filter shape would closely resemble a parabola or similar shape (also referred to herein as a "pseudo-parabola" whose minimum or maximum insertion loss (i.e., the minimum and maximum of the spectral filter function) is within the operating spectal band of the amplifier, and preferably is near the center wavelength of the gain spectrum of the amplifier. The filter wavelength that corresponds to minimum or maximum insertion loss is defined as the center wavelength of the optical filter. Such a spectral filter function and its corresponding loss spectrum change induced by a simple wavelength shift of the filter are illustrated in FIGS. 4A and 4B. In contrast to the "slope VOA," only the change of the spectral shape of the filter is linear.

Figure 5A:
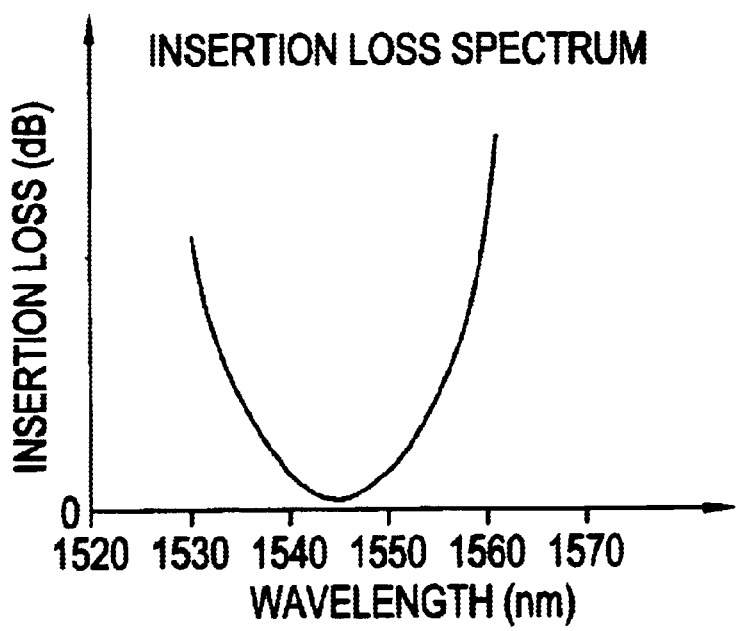
FIG. 5A is a plot of the insertion loss spectrum having a sinusoidal filter function exhibited by a filter constructed in accordance with an embodiment of the present invention.
Figure 5B:
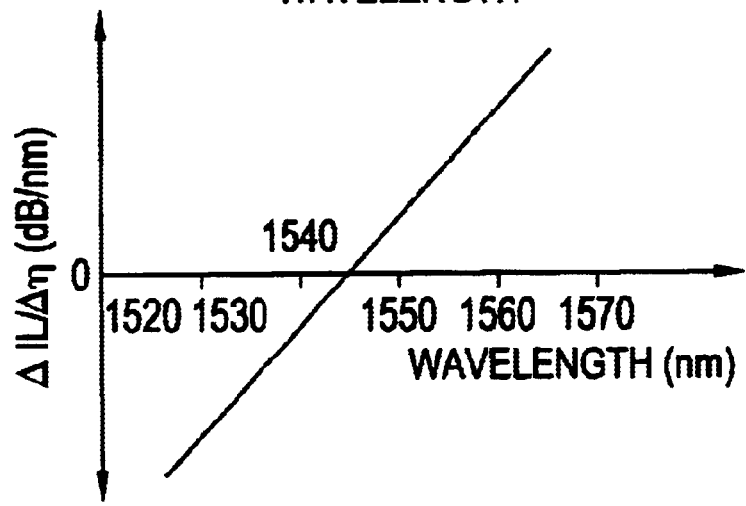
FIG. 5B is a plot of the first derivative of the insertion loss spectrum as a function of wavelength.

While the preferred embodiment mentioned above and described in detail below pertains to a parabolic or a pseudo-parabolic spectral filter function, it will be appreciated by those skilled in the art that other shapes may be utilized that approximate a parabola or that have an entirely different shape. Such functions should preferably have symmetry about a central wavelength. Nevertheless, asymmetrically shaped functions may be useful for certain applications. With respect to a parabolic spectral filter function, a sinusoidal spectral filter function with fixed amplitude and one of the insertion loss minima within the operating signal band of the amplifier is a satisfactory approximation to a parabola. A filter phase adjustment (which induces a center wavelength shift) alone will result in an approximately linear gain spectral change. For an optical filter with a sinusoidal spectral filter function, the term "phase adjustment" corresponds to phase argument (i.e., change of the position of the minimum) of the sine function. This is because the derivative of the filter is approximately a linear function of wavelength in the considered spectral bandwidth. This phenomenon is illustrated in FIGS. 5A and 5B.

It should be noted that the desired spectral gain change is not limited to a linear function of wavelength, but rather is constrained only by the complexity of the spectral filter function. The device of the present invention is intended to have a simplified construction and therefore multiple filter terms (Fourier terms for sinusoidal filters) are not considered, although they would enable more complex gain changes. To determine the required filter function, which is necessary to achieve a given spectral gain change with the inventive filter, one need only to mathematically integrate the desired gain change function.

Figure 6B:
FIG. 6B illustrates tapered coupler regions of the Multiclad Mach-Zehender (MCMZ) filter with protective tubes or sleeves placed around these regions.
Figure 6C:
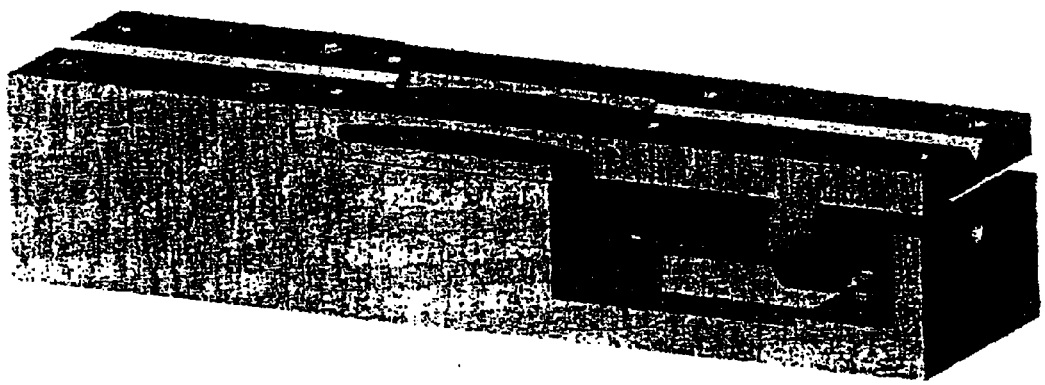
FIG. 6C illustrates a mount that for holding Multiclad Mach-Zehender device of FIG. 6B.

FIG. 6A shows an example of a construction that may be used to construct the filter 20 (or variable VOA) of the present invention. As shown, filter 20 may be implemented using a Mach-Zehnder interferometer configured to produce a raised cosine function (defined as y=1+cos (x), i.e.—the cosine function is shifted upwards with respect to the horizontal axis, so as not to have negative or zero values,). Such an interferometer, over a relatively limited operating wavelength band, provides a substantially parabolic spectral filter function. As illustrated in FIG. 6A, such a Mach-Zehnder interferometer includes a splitter 50, which splits the incoming signal to propagate along two arms 52 and 54 of the interferometer. A coupler 56 is provided to couple the ends of the two arms thereby causing interference of the signals propagating through the two arms. The resultant signal is provided at an output of the interferometer. One of the first or second arms of the interferometer has a phase shift region (acted upon by a phase shifter 58) that provides that arm with a different optical path length than the other arm so as to introduce a phase delay in one of the two signals that are combined together by coupler 56. To allow this interferometer to be implemented as a tunable filter, the phase delay in one of the two arms of the interferometer may be adjustable. By changing the relative phase delay between the two arms, the center wavelength at which the most destructive interference occurs can be made to shift (or at which the most constructive interference occurs depending upon the phase). The interferometer may use any well-known phase shifting means for varying the phase delay in one of the two arms of the interferometer. This can be achieved, for example, by temperature change, or by expansion or compression of the optical fiber in one of the arms of the interferometer. The design may be modified by including a low-voltage contact switch at the far end of the flexure to provide indication of a particular, calibrated position. Protective tubes 59, or sleeves, of glass, metal, or other material may be placed around the tapered coupler regions of the Multiclad Mach-Zehender (MCMZ) filter to prevent bending of these regions. This is shown in FIG. 6B. Then the MCMZ device is fixed into the flexure mount by clamping and/or epoxying one or both ends into a V-grove in the flexure/mount. A unique one-piece flexure mount for the above described optical filter is shown in FIG. 6C. This mount is monolithic block with V-grove to position the MCMZ and a thinned out center section to control bending motion. The bending motion is provided by a motor driven cam. Features to mount the motor, to support the cam, to restrain the device, to provide a cam stop, and to mount the assembly are also included in the design. The Mach-Zehnder interferometer shown in FIG. 6A is preferably configured to produce an interference signal at its output, which attenuates signals in accordance with a spectral filter function that resembles a parabola. The central wavelength of this filter function corresponds to the minimum of the parabola and may be shifted by adjusting the relative phase of one or both of the arms of the Mach-Zehnder interferometer. As will be appreciated by those skilled in the art, the parabola is derived from a cosine function, and hence the central wavelength could correspond to a maximum of the portion of the cosine or cosine squared function that lies within the limited operating wavelength band. It may be useful in some applications to use an inverted approximated parabolic filter function whereby the central wavelength corresponds to the maximum of the cosine (or cosine squared) spectral filter function.

Figure 6D:
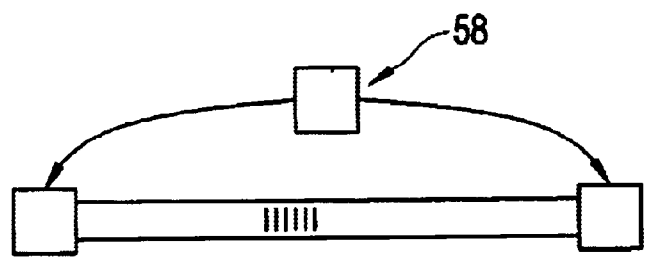
FIG. 6D is a schematic diagram of a grating that may be implemented as the tunable filter of the present invention.
Figure 6E:
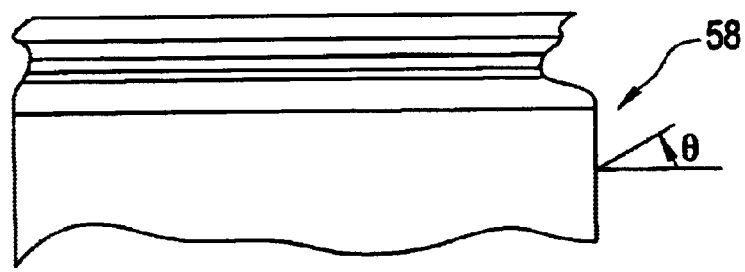
FIG. 6E is a block diagram of a dielectric stack filter that may be implemented as the tunable filter of the present invention.
Figure 6F:
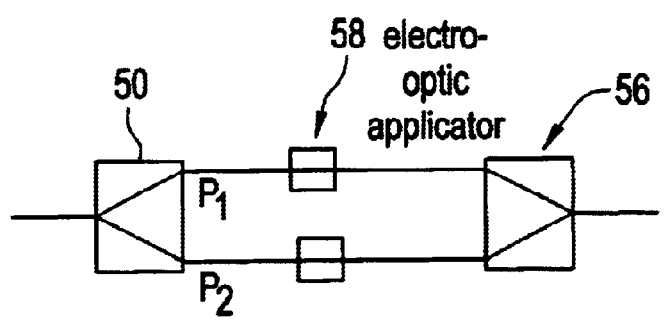
FIG. 6F is a block diagram of a Mach-Zehnder interferometer that incorporates at least one birefringent crystal and that may be implemented as the tunable filter of the present invention.

The optical filter of the present invention may be also implemented by utilizing a grating with a parabolic insertion loss function, for example, a long period grating LPG or a fiber Bragg grating FBG (FIG. 6D); or a dielectric thin film stack (FIG. 6E) with a parabolic or pseudo-parabolic insertion loss function. If the optical filter is in the form of a grating, the grating, under stress (due to expansion or compression or temperature change, applied, for example, by the phase shifter 58) can modify the insertion loss dependence on wavelength and, therefore, change the slope of the curve, changing the amount of insertion loss versus wavelength. If the optical filter is in the form of a dielectric stack, the stack will need to be tilted by the phase shifter 58, (by an angle $\theta$, for example) in order to shift the center wavelength of the parabolic insertion loss function. Finally, the Mach-Zehnder interferometer may include one or more birefringent crystals for separating and recombining two orthogonal polarization P1 and P2. A birefringent crystal when subjected to electro-magnetic field it changes its index of refraction for different polarizations. Therefore, when an electro-optical applicator is utilized by the phase shifter 58 to change the voltage applied to at least one of the birefringent crystal, it changes the optical path difference between the two orthogonal polarization thus changing the insertion loss function (spectral filter function) of the improved optical filter. This illustrated in FIG. 6F.

Figure 12:
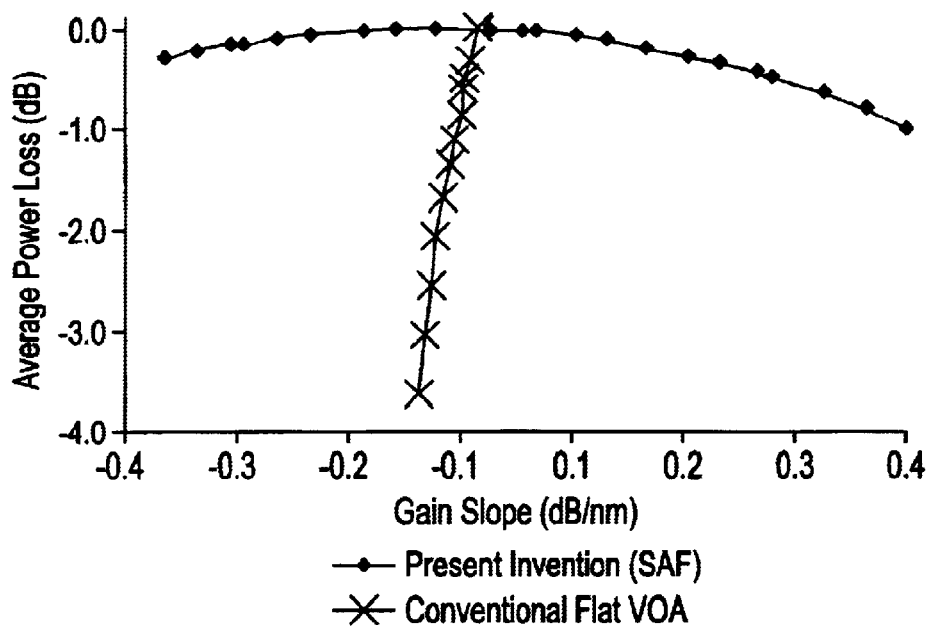
FIG. 12 is a comparative graph of the average power loss as a function of gain slope for the inventive filter and a conventional flat VOA.
Figure 13:
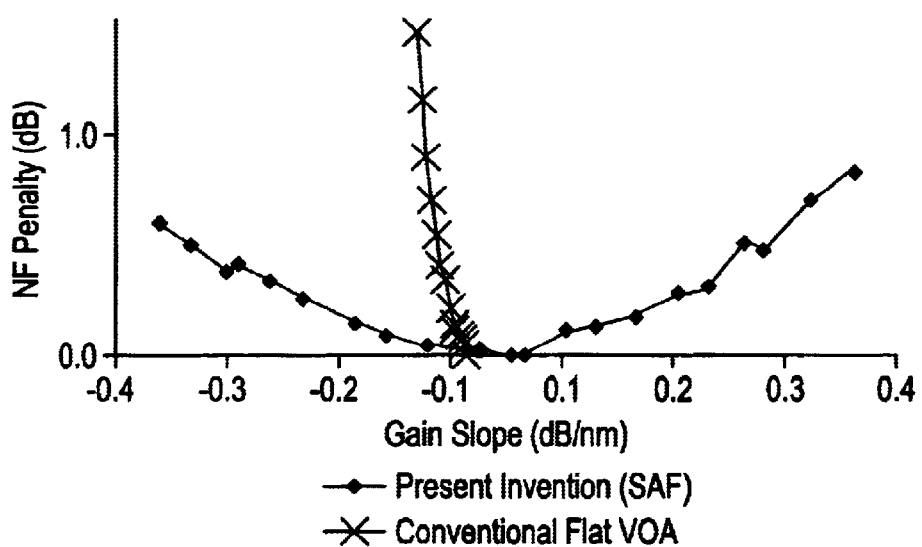
FIG. 13 is a comparative graph of the NF penalty as a function of gain slope for the inventive filter and a conventional flat VOA.

The filter of the present invention exhibits several features and advantages over the conventional flat spectral VOA and the "slope VOA." Specifically, the slope of the filter may be adjusted without significant impact on performance (i.e., with reduced NF change and ripple change penalties). See, for example, FIGS. 12 and 13. Further, flat VOAs cannot achieve desired gain slope when the input power is lower than the designed input power. This is not a problem for the optical filter of the present invention, because the center wavelength is shifted from one wavelength extreme to another wavelength extreme to provide dynamic range of the gain slopes. Additionally, the adjustment of spectral gain shape, especially the gain slope, is achieved by adjusting only one parameter, such as the center wavelength (or filter phase). This reduces the number of control signals and adjustments required to an absolute minimum. Also, this filter enables gain slope adjustment under some circumstances using a look-up table, without necessitating measurement of the filter transmission spectrum because the filter transfer function can be designed to be very predictable as a function of the phase adjustment. Additionally, the necessary minimum loss or average power loss of the filter to provide a certain gain slope change can be significantly smaller (up to 4 dB) than a comparable "slope VOA." A typical "slope VOA" shows average power loss of 5 to 6 dB.

The optical filter of the present invention has a small average power loss (1–2 dB), therefore less optical power is dissipated irreversibly in the optical filter. Hence the optical filter has reduced risk for operation under high power (i.e., about 300 mW or higher of optical input signal power The spectral filter functions of the optical filter of the present invention are symmetric about the center wavelength in the bandwidth of the EDFA. These spectral filter functions can be designed so that the average power loss of the optical filter does not change by more than 2 dB and preferably no more than 1 dB throughout the tuning range. This is achieved because the excess loss is added at one extreme end of the spectrum and is reduced from the other extreme end of the spectrum, provided the wavelength about which symmetry occurs remains within the bandwidth of the EDFA. This approximately constant average power loss (less than 5 dB, preferably less than 3 dB, more preferably less than 2 dB and most preferably no more than 1 dB) provides an approximately constant average loss throughout the amplifier operating conditions, therefore maintaining an approximately constant population inversion (in the homogeneously broadened gain approximation) and design specified t pump power requirement even though a change of the spectral gain is induced. The additional spectral insertion loss function of the filter can offset part of the gain-flattening filter (GFF) requirement for the amplifier, thereby reducing the depth and/or slope of the required GFF shape when using the VOA device as described above. This filter can introduce any spectral gain shape, which can be described by $df/d\lambda \sim K^*(S_1(\lambda)-S_0(\lambda))$, with $S_0(\lambda)$ and $S_1(\lambda)$ the starting point and ending point of the spectral gain shapes (which correspond to two center wavelength settings of this device, $\lambda_0$ and $\lambda_1$, respectively), $f(\lambda)$ is the spectral filter function, and $0 < K \leq 1$. The filter can be designed so that the minimum average insertion loss of the device occurs for any required gain tilt (i.e., even for the smallest required gain tilt parameter A (largest negative number for A)), which is also not possible with the VOA devices described above. Additionally, the inventive optical filter may be designed so that the minimum average insertion loss of the device occurs for any required gain slope setting, i.e., even for the smallest required gain slope, which is not possible with the prior VOA devices described above as that would impose a requirement for more baseline loss.

If the optical filter of the present invention utilizes a Mach-Zehnder interferometer (for example, fiber based, Mach-Zehnder interferometer) it can have low polarization dependent loss (PDL), polarization mode dispersion (PMD) and dispersion properties and can be compatible with high bit rate applications. Low PDL is PDL that does not increase by more than 0.01 dB for 1 dB of average insertion loss change. Low PMD is PMD that is less than 0.05 ps, preferably less than 0.02 ps and more preferably less than 0.01 ps.

Figure 14A:
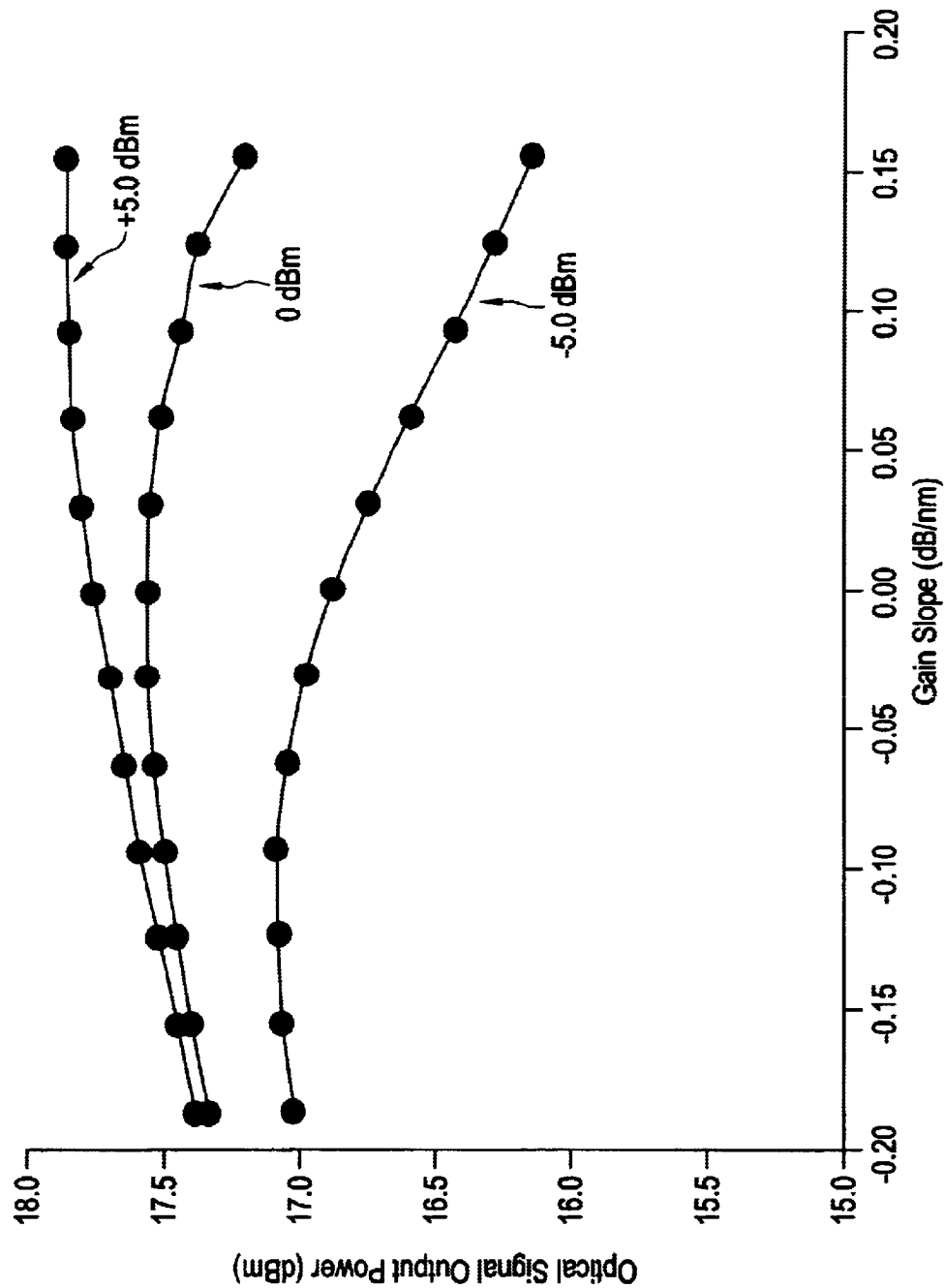
FIG. 14A illustrates optical output power versus gain tilt when an optical amplifier utilizes the filter of FIG. 6A.
Figure 14B:
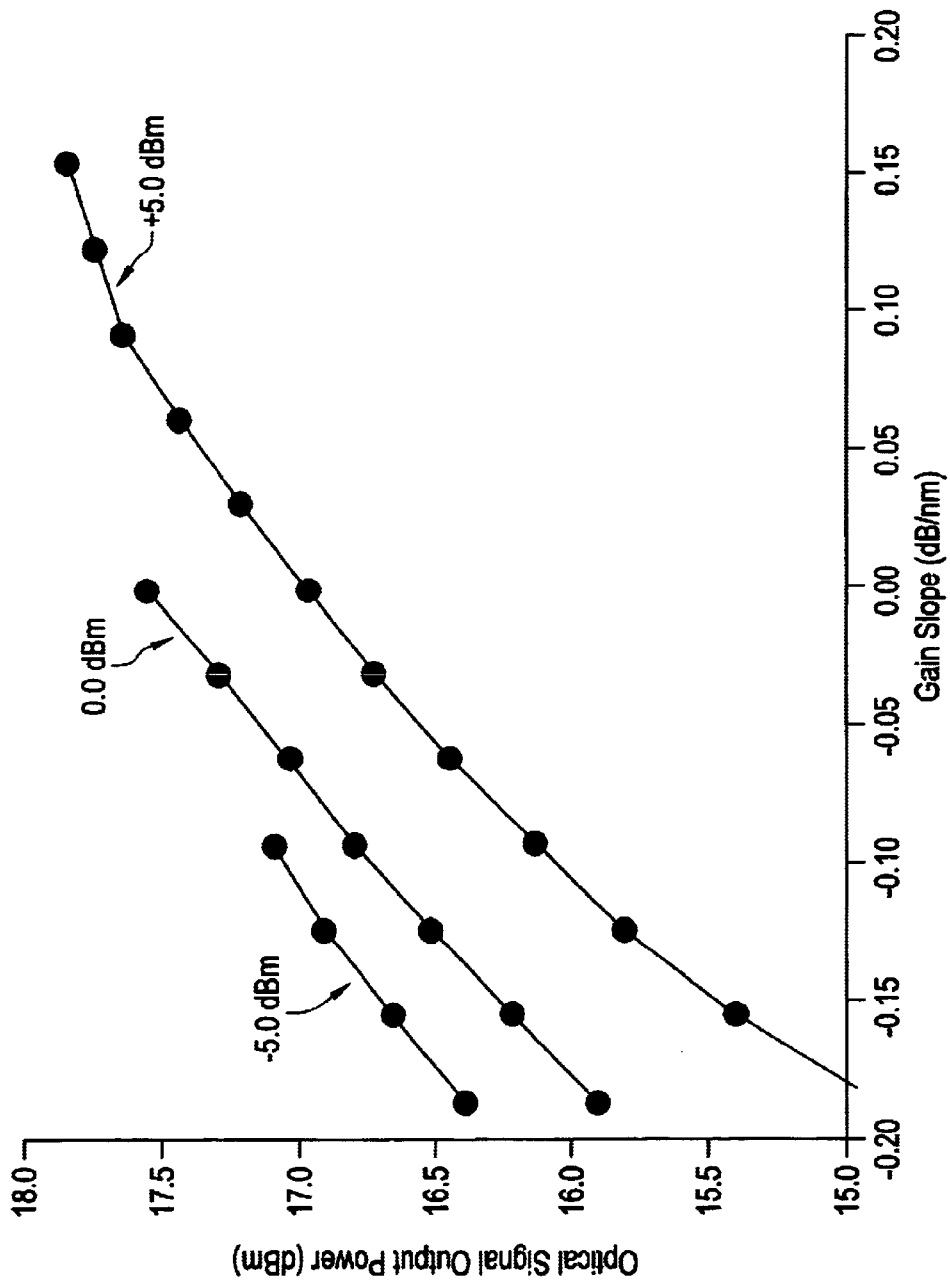
FIG. 14B illustrates optical output power versus gain tilt when an optical amplifier utilizes a VOA.

FIGS. 14A–14B, 15A–15C and 16A–16C illustrate the advantages described above with an experimental data. The Erbium doped fiber amplifier used in the experiments had two stages. Either an optical filter (with pseudo-parabolic spectral filter function) of the present invention, or a flat VOA, both utilized in conjunction with a GFF, was introduced between the two stages. The optical filter of the present invention utilized a fiber based Mach-Zehnder interferometer. The first stage 12a of the optical amplifier was forward pumped with a 150 mW, 1480 nm pump and second stage 12b was both forward and backward pumped with 150 mW 1480 nm pumps. A normal operating condition (NOC) (i.e., the design condition) was defined at 0.0 dBm total input power with 0 dB spectral tilt over the signal band (1530 nm to 1562 nm) and 17.0 dB gain with a target noise figure (NF) under NOC of 6.0 dB. The input power was varied from −5.0 dBm to 5.0 dBm in increments of 1 dBm. At each input power condition, the central wavelength of the optical filter according to present invention or, average loss of the flat VOA, was adjusted to achieve spectral tilts of −5 dB to +5 dB with 1 dB increment. Pump power was kept constant through out the experiment. FIGS. 14A and 14B demonstrate the average power penalty at the output of the amplifier for different input powers and output signal tilts for the amplifier with VOA and the optical filter according to present invention, respectively. FIGS. 14A and 14B illustrate that the amplifier that utilizes the optical filter of the present invention provides improved performance over the amplifier that utilizes only VOAs. More specifically, for the input power and gain tilt ranges studied, output power penalty is 1.7 dBm for the amplifier with optical filter of the present invention and 3.0 dBm for the amplifier with VOA.

Figure 15B:
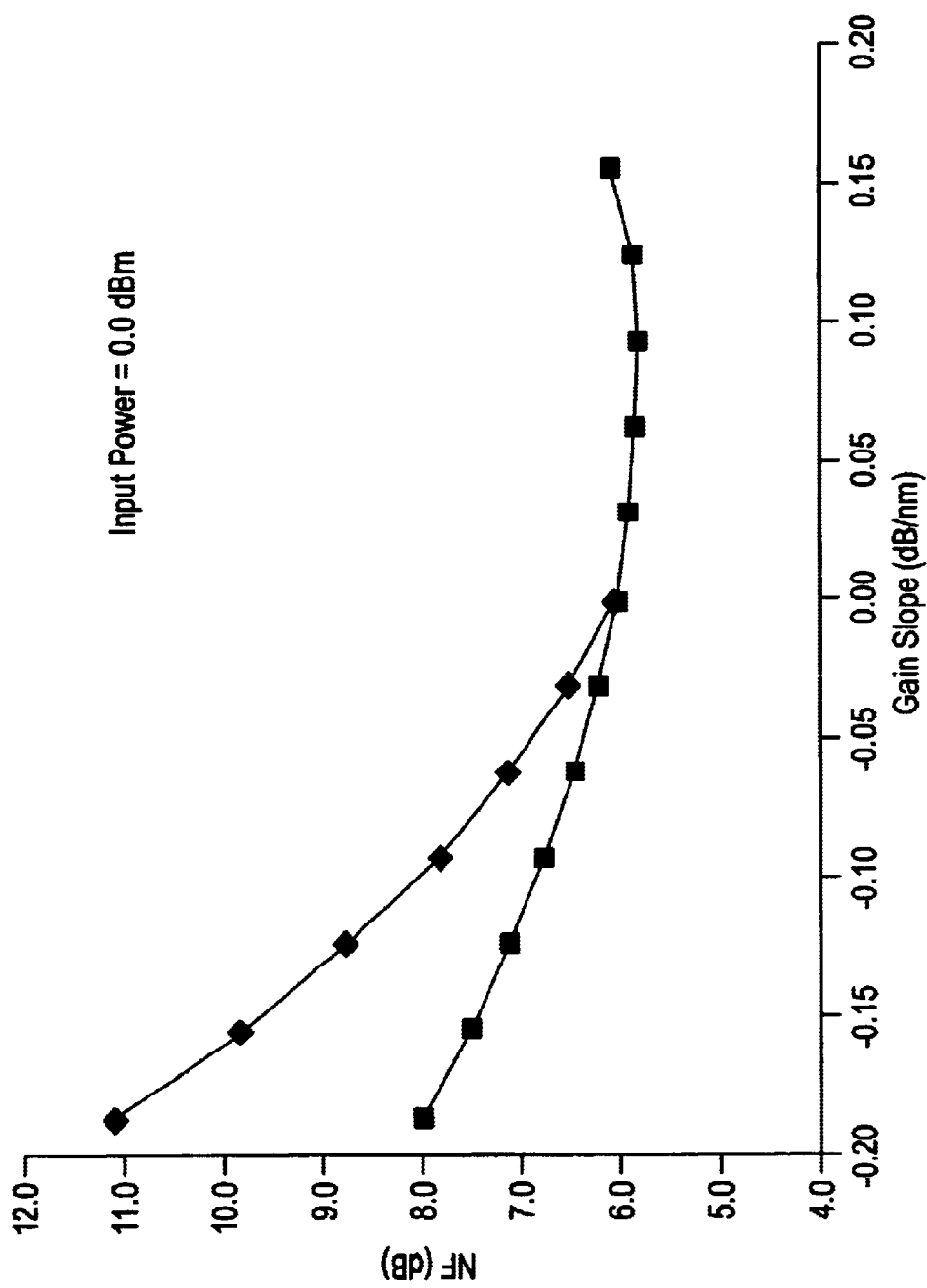

FIGS. 15A, 15B and 15C demonstrate the NF (Noise Figure) performance advantage of the amplifier with the optical filter according to present invention, over the amplifier with regular VOA. In these figures, the curves with dark squares represent the performance of the amplifier that utilizes the filter of the present invention, while the curves with the diamond shapes correspond to an amplifier that utilizes the VOA. These figures illustrate that the NF from the amplifier with the VOA increases more rapidly away from the NOC than the amplifier with the optical filter according to present invention. The advantage in the output power and the NF for the amplifier with the optical filter according to present invention can be explained by the change in average insertion loss of the exemplary optical filter according to present invention compared to the flat VOA. The average insertion loss of the optical filter according to present invention changes less than 1.5 dB with shift in central wavelength, hence the average output power and NF are not severely affected. The flat VOA, introduces large average insertion loss change (up to 16 dB), decreasing the average power at the output and resulting in a larger penalty in NF.

Figure 16A:
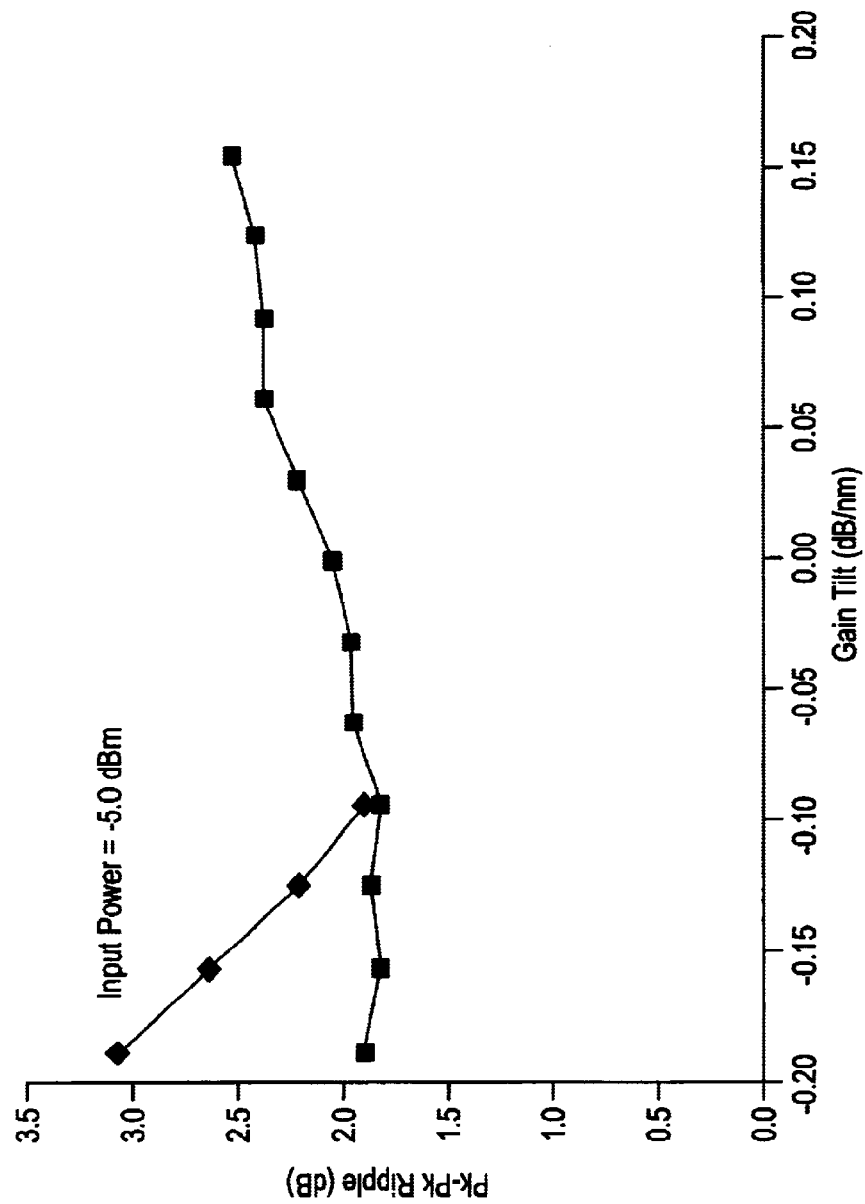
FIGS. 16A–16C illustrate the gain ripple dependency on gain tilt of two optical amplifiers, for input powers of −5.0 dBm, 0.0 dBm, and 5 dBm, respectively.
Figure 16B:
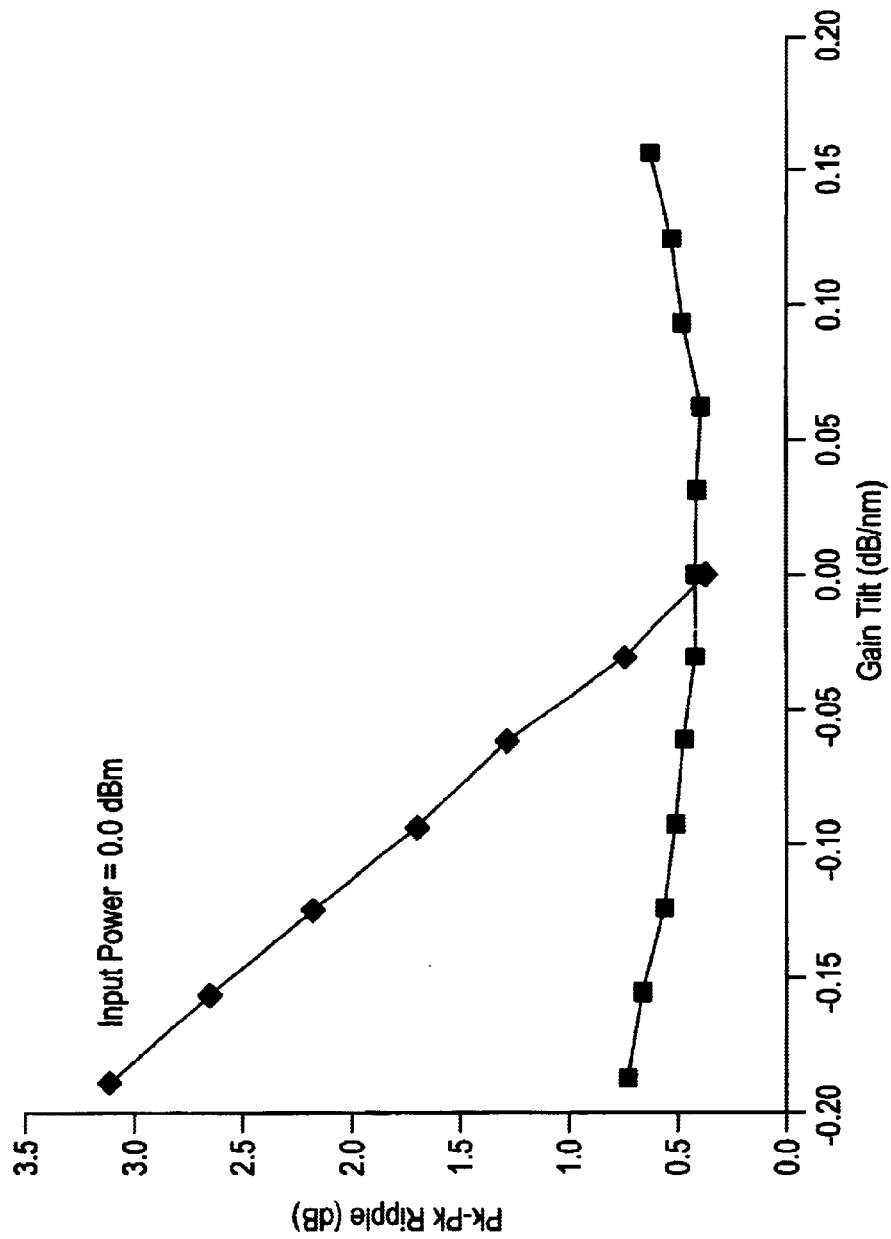
Figure 16C:
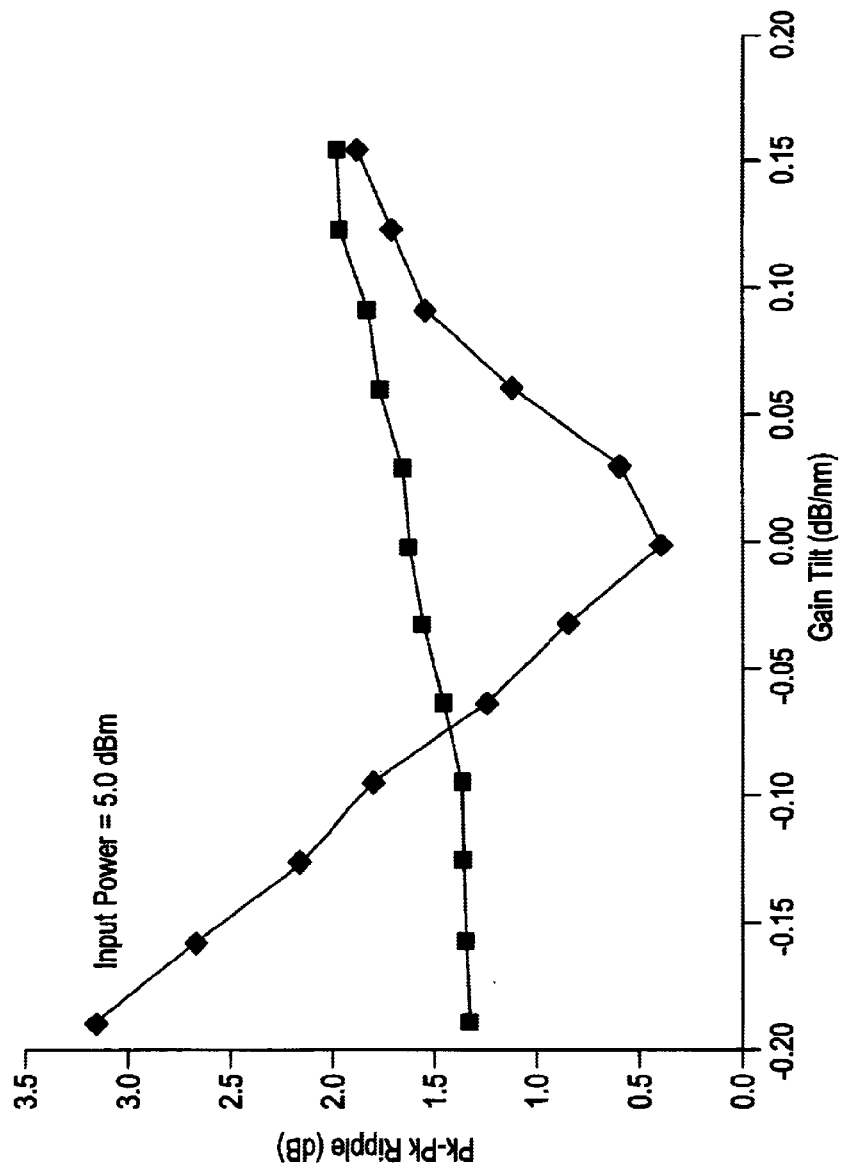

FIGS. 16A, 16B and 16C show the comparison of gain ripple, defined as the peak to peak deviation from linearity, for the amplifiers described above, i.e., one with the exemplary the optical filter according to present invention and the other with flat VOA. The amplifier that incorporates the optical filter of the present invention shows very small ripple penalty compared to the amplifier with VOA when operated at the input power corresponding to NOC, i.e. 0.0 dBm. When input power is higher or lower than the NOC, maximum ripple for the amplifier with the optical filter according to present invention is smaller than the amplifier with VOA.

Further, FIGS. 14A–16C illustrate that the amplifier with the exemplary optical filter according to present invention has better dynamic range in gain slope. The amplifier with a flat VOA cannot achieve all values of the desired gain slope when the input power is lower than the designed input power. This is not a limitation of the optical filter of the present invention, because the center wavelength of the optical filter of the present invention can be shifted from one extreme wavelength to another to provide dynamic range of the gain slope. As illustrated in FIGS. 14A–16C, the amplifier with the optical filter according to present invention can achieve any gain slope condition for any given input power, without pump power adjustments indicating a clear advantage over the amplifier with flat VOA.

One problem that arises through the use of optical amplifiers and, in particular, EDFAs, is that the gain spectrum tends to vary with fluctuations in the operating temperature. Such optical amplifiers may be exposed to operating temperatures ranging from −5° C. to 75° C. Unless otherwise compensated, the gain spectrum of the optical amplifier will change significantly with temperature. In general, all components in the amplifier contribute to this variation, but the dominant contributions are typically from the gain medium (i.e., for example, the erbium-doped fiber coil).

Figure 7:
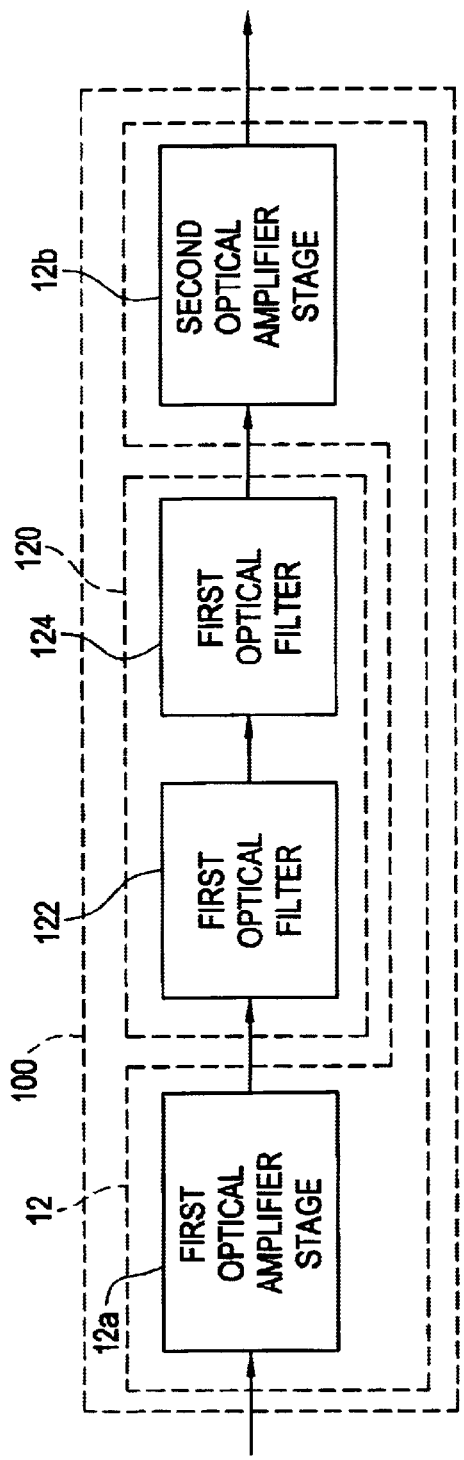
FIG. 7 is a block diagram of an optical amplifier system constructed in accordance with another embodiment of the present invention.

FIG. 7 shows an optical device in the form of an optical amplifier system 100 constructed in accordance with another embodiment of the present invention. In this particular example, an optical filter is provided for compensating for these thermal gain variations, which are also known as "thermal wiggle" or "thermal ripple."

As shown in FIG. 7, optical amplifier system 100 includes an optical amplifier 12 and a gain-flattening filter 120. As will be described further below, gain-flattening filter 120 preferably includes a first optical filter 122 and a second optical filter 124, and optical amplifier 12 includes a first stage 12a and a second stage 12b each including an amplifying medium, such as a coil. First and second optical filters 122 and 124 are coupled between the input and the output of the optical device and are preferably coupled in series between stages 12a and 12b.

Figure 8:
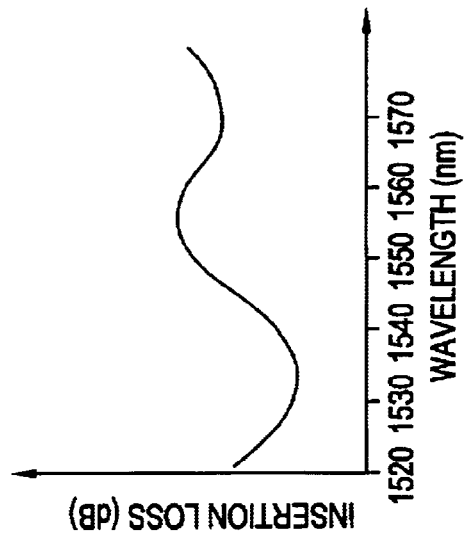
FIG. 8 is a graph showing the gain of a typical optical amplifier as a function of wavelength.

FIG. 8 is a plot of the gain of optical amplifier 12 as a function of wavelength. As illustrated, the gain of optical amplifier 12 is not flat, but rather is a function of wavelength.

Figure 9:
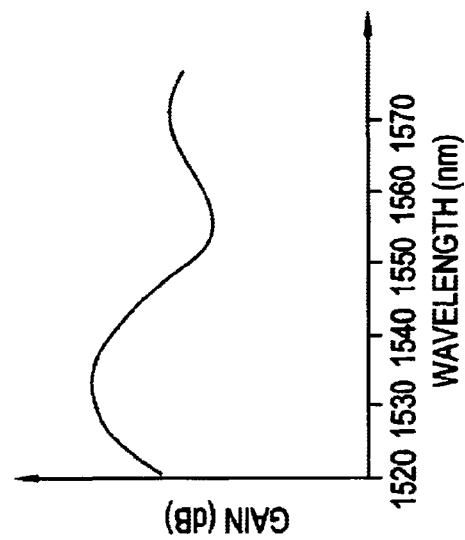
FIG. 9 is a graph showing the transmission characteristics as a function of wavelength for a gain-flattening optical filter constructed in accordance with the present invention.

FIG. 9 is a plot of the insertion loss with respect to wavelength λ for an optical filter that is matched to the optical amplifier 12 so as to provide flat gain. More specifically, the optical filter is a gain-flattening filter 120. The spectral filter function (or insertion loss) of the optical filter 120 is not parabolic but has a shape that flattens the gain provided by the optical amplifier system 12 (shown in FIG. 8). Therefore, the output of the optical amplifier system 10 would exhibit uniform gain across the wavelength band of interest.

Figure 10:
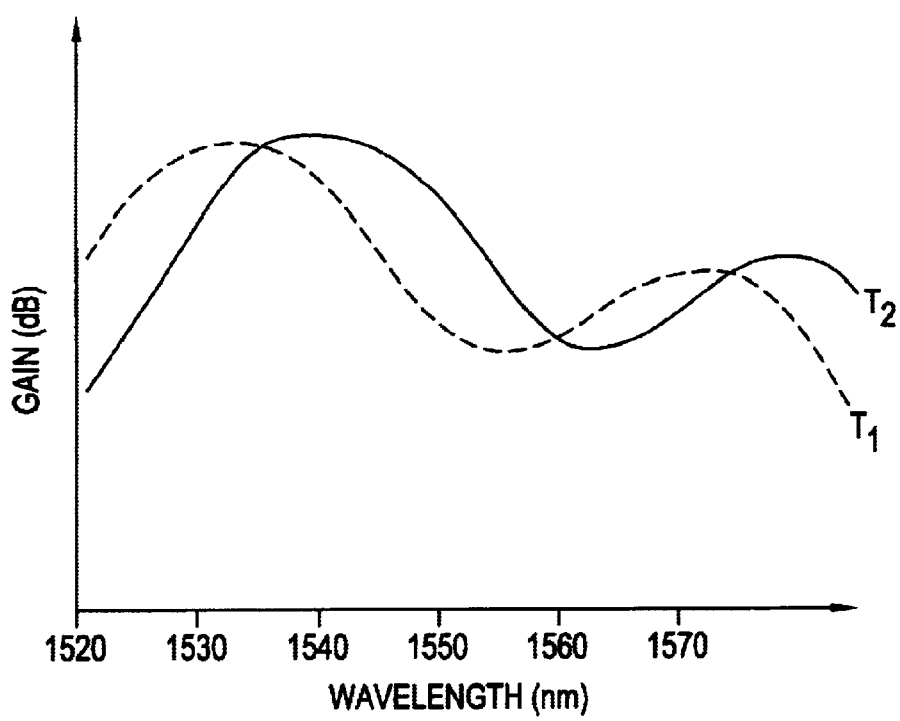
FIG. 10 is a graph showing the variation in the gain spectrum caused by a shift in the operating temperature.

FIG. 10 shows two plots of the gain spectrum (i.e., gain as a function of wavelength) of optical amplifier 12 each taken at different operating temperatures $T_1$ and $T_2$. As apparent from FIG. 10, the gain spectrum of optical amplifier 12 changes shape with changing temperature.

Figure 11:
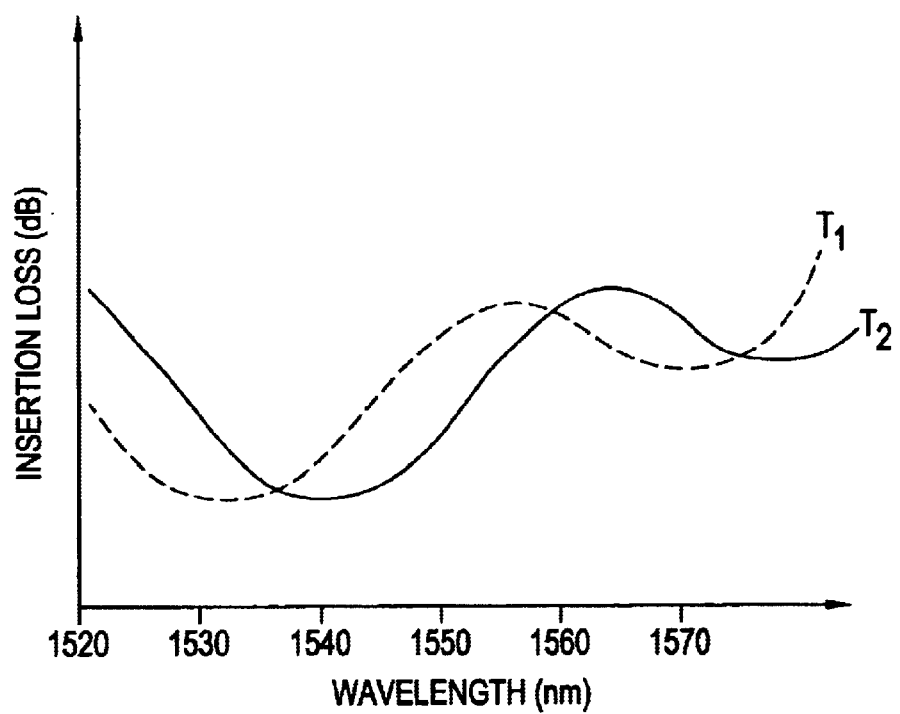
FIG. 11 is a graph illustrating the variation in the transmission spectra of a gain-flattening optical filter constructed in accordance with the present invention caused by a corresponding shift in operating temperature similar to that affecting the gain spectrum shown in FIG. 10.

Rather than utilizing a heating or thermal control system as described above, the optical amplifier system 100 utilizes a gain-flattening filter 120 as another embodiment of the optical filter of the present invention. This gain flattening filter (GFF) and is designed to experience a shape change in its insertion loss spectrum (i.e., insertion loss as a function of wavelength) as the operating temperature changes that corresponds and directly compensates for a shape change in the amplifier gain spectrum. An example of a gain-flattening filter for use with an optical amplifier having the gain spectrum shown in FIG. 10 is illustrated in FIG. 11. Thus, this embodiment of the optical filter (i.e., gain-flattening filter 120) of the present invention has a loss spectrum that is a function of not only wavelength, but temperature, so as to track the changes in the gain spectrum resulting from a change in operating temperature. This solution is described mathematically as follows.

First, the rate of thermal gain change of the amplifier is measured by measuring the gain $G(T_1)$ of optical amplifier 12 at a first temperature $T_1$ and then again measuring the gain $G(T_2)$ of optical amplifier 12 at a second temperature $T_2$. The rate of thermal gain change is thus approximated as:

$$\frac{\Delta G}{\Delta T} = \frac{G(T_2) - G(T_1)}{T_2 - T_1}$$

This approach to the design of the gain-flattening filter 120 assumes a linear change of amplifier gain with temperature. In reality, the gain change is not strictly linear, nor is the gain shape change the same from one wavelength to the next. Moreover, the gain shape change at one wavelength is not related by a simple scaling of the gain shape change in another wavelength. Despite these caveats, however, the assumption of linearity is sufficiently good to permit substantial cancellation of thermal gain variation over a wide range of temperatures.

For an optical amplifier system 100, the net gain of the system $G_{net}$ ($G_{net}$ is the erbium gain minus the gain flattening filter insertion loss spectrum) should not vary substantially with changes in temperature T. Thus, gain-flattening filter 20 should be designed such that $$\frac{dG_{net}}{dT} = 0.$$

To obtain this result, the first order derivative $$\left(\frac{dL}{dT}\right)$$

of the filter insertion loss (L) with respect to operating temperature T must be substantially equal to the linearized first order derivative $$\left(\frac{dG}{dT}\right)$$

of the gain of the optical amplifier with respect to the operating temperature.

As noted above, we can determine the value of $$\frac{dG}{dT}$$

simply by measuring the gain spectrum of the optical amplifier at different temperatures over an operating temperature range.

As shown in FIG. 7, gain-flattening filter 120 may include a first optical filter 122 and a second optical filter 124. Two such filters are preferably utilized to make the overall gain flattening filter more practical to design. More specifically, first optical filter 122 may be designed to have an athermalized insertion loss spectrum (i.e., an insertion loss spectrum that is substantially stable over the operating temperature range) while second optical filter 124 may be designed to have an insertion loss spectrum that varies substantially as a function of operating temperature. In this manner, the sum of optical filters 122 and 124 may be designed for optimal gain flattening as a result of wavelength without concern for the extent of thermal ripple of optical amplifier 12. Second optical filter 124 is designed with the aim to closely match the thermal gain variation of optical amplifier 12 without as much concern for compensating for the change in gain as a function of wavelength. Thus, the insertion loss spectra of first and second optical filters 122 and 124 are additive and thereby combine to compensate for variations in the gain of optical amplifier not only as a function of wavelength but also as a function of operating temperature.

The aggregate gain-flattening filter insertion loss spectrum (L) is equal to the sum of the insertion loss $L_1$ of first optical filter 122 and the insertion loss $L_2$ of second optical filter 124 (i.e., $L=L_1+L_2$). The insertion loss of a filter is defined as $100-T(\lambda)$, where T is the transmission of the filter at any particular wavelength $\lambda$ expressed in percents. The net gain of $G_{net}$ of optical amplifier system 100 is thus equal to the gain G of optical amplifier 12 minus the insertion loss $L_1$ of first optical filter 122 minus the insertion loss $L_2$ of second optical filter 24 (i.e., $G_{net}=G-L_1-L_2$). Because $L_1$ does not vary with temperature $$\left(\frac{dL_1}{dT}=0\right),$$

the following equation should hold true:

$$\frac{dG_{net}}{dT}=\frac{dG}{dT}-\frac{dL_2}{dT}=0$$

The second filter insertion loss spectrum $L_2$ is a function of wavelength $\lambda$ and thermal dependence of the center wavelength $\lambda_0(T)$. The second filter spectrum $L_2$ ($\lambda$) and thermal filter spectral shape change is designed such that:

$$\frac{d\lambda_0}{dT}\cdot\frac{dL_2}{d\lambda}=-\frac{dG}{dT}$$

Here, the thermal dependence of the second filter spectrum is assumed to be entirely contained within the term $\lambda_0(T)$. This implies that the entire filter spectrum shifts bodily with respect to wavelength when the temperature changes. For most cases, $\lambda_0$ changes approximately linearly with temperature and, for some structures, increases with increasing temperature, and for other structures decreases with increasing temperature.

To design a gain-flattening filter having the desired characteristics, first optical filter 122 may be designed using conventional techniques to ensure that it does not have an insertion loss spectrum that varies with respect to temperature while compensating for a significant portion of the gain of optical amplifier as a function of wavelength. For example, first optical filter 122 may be a conventional athermalized dielectric multi-layer thin film stack or an athermalized fiber Bragg grating (FBG). A FBG may be athermalized by mounting the end supports for the FBG to a substrate having a negative coefficient of expansion that counters that of the FBG. A dielectric multi-layer thin film stack typically includes alternating layers of a first material having a high index of refraction and a second material having a low index of refraction.

Second optical filter 124 preferably is responsive to a single parameter to change its gain characteristics and hence maintain the gain characteristics of the system 100 as the operating temperature changes. Second optical filter 124 may be a FBG. Such FBGs include an optical fiber having a plurality of substantially equally spaced changes in refractive index. A substrate having a pair of supports is used to hold the fiber on opposite sides of the grating. In general, as the fiber is exposed to increasing operating temperature, the fiber undergoes thermal expansion to expand linearly, which correspondingly increases the periodic spacings between the refractive index changes of the grating. The increase in these spacings changes the insertion loss spectrum of the FBG. By controlling the thermal expansion of the FBG, changes in the insertion loss spectrum as a function of operating temperature may be controlled. The thermal expansion of the FBG can be controlled through the selection of the materials of which the fiber and the support substrate are made.

The present invention as described further provides a method of compensating for variations in the gain spectrum of an optical amplifier that occur with fluctuations in operating temperature. The method includes the steps of providing an optical filter having an insertion loss spectrum that varies with fluctuations in operating temperature, and positioning the optical filter in the optical path of the optical amplifier.

While the above invention has been described with respect to an optical amplifier including an Erbium doped fiber, the invention is equally applicable to a discrete or distributed Raman amplifier, as well as other forms of amplifiers.

Also, although the present invention has been described above as providing an average power loss that remains substantially constant throughout its tunable range, the filter may be used in optical systems where the filter may only need to exhibit substantially constant average power loss at two or more discrete intervals or states of a pertinent parameter. In other words, the inventive optical filter may have two or more discrete states that provide two or more corresponding discrete gain spectra. For example, one discrete state may be the gain spectra for a first temperature (e.g., the gain spectra of an Erbium coil at 0° C.) and another state may be the gain spectra for a second temperature (e.g., the gain spectra of an Erbium coil at 70° C.) when used as a thermal ripple flattening filter. Thus, a single parameter of the filter (i.e., center wavelength of the filter) may be shifted (by stretching a FBG, twisting a coupler, etc.) to produce at least two discrete and unique gain spectra using an arbitrarily shaped filter whose filter shape is derived from the difference function between the two states. In such a manner, the loss of the filter may be shifted to compensate for the difference in the amplifier gain spectrum at two or more different temperatures.

If the optical filter were optimized to provide the smallest error between two discrete states, a two-state system could be nearly perfectly compensated. If the function (i.e., the gain spectrum as a function of temperature) were a linear interpolation between the two gain spectra at the two discrete states, then it would work for all states in between provided the filter were linear. If the system only required the filter to exhibit two discrete gain spectra, neither the gain spectra nor the filter function need be linear between the two discrete states, but only need to appear linear at the two states. Thus, the optical filter could function as a two-state optical filter switch.

Another example where the inventive optical filter may be implemented as a two-state filter, is when the filter is used in a Raman application. If there is a Raman in the optical fiber span of an optical system, the amplifier operates in the C-band alone, and one wishes to upgrade the span to include the L-band, or vice versa, more pumps must be added and a filter must be added to re-equalize the gain. However, one would typically have to either shut the system down to insert a new gain-flattening filter or have utilized a very expensive dynamic gain-flattening filter to re-equalize the channels. The inventive filter, however, may be used as a two-state optical switch filter that selectively provides either a spectral filter function $f_1(\lambda)$ that is optimal for the C-band or a spectral filter function $f_2(\lambda)$ that is optimal for the C- and L-bands. In this manner the system may be upgraded to include an additional L or C band simply by shifting the single parameter (central wavelength) of the filter function without taking the system down and at a very low cost and low complexity.

Examples of functions that are not necessarily linear, but may, in some circumstances, be closely approximated by linear interpolation between two discrete gain spectra include "thermal wiggle," which is the gain spectrum of the Erbium coils as a function of temperature, C-band vs. C- and L-band upgrades, and "spectral hole burning" where the gain spectrum of the amplifier depends on the total or the individual channel paths going in. An optical amplifier having a well-populated input signal of high power (i.e., 56 channels at 0 dBm) will cause significant spectral hole burning or inhomogeneous broadening of the gain spectrum, and if the number of channels or power is reduced substantially, the gain spectrum of the amplifier will change because spectral hole burning will be weaker. To perfectly compensate for these two extremes, a two-state filter can be designed according to the present invention whose derivative corresponds to the difference in the gain spectra for the two spectrally hole burned or less spectrally hole burned gain spectra in the amplifier.

Thus, generally speaking, the center wavelength of the optical filter may be adjusted as a function of the input spectral signal content to the optical amplifier. The optical filter may change the gain slope or shape of the optical amplifier in response to: (1) a change in the input spectral signal content that occurs as a result of variations of loss in an optical fiber span of an optical system in which the optical amplifier is utilized; or (2) a change in the spectral signal content of the optical system that occurs as a result of variations of Raman gain in an optical fiber span of the optical system. The Raman gain may vary as a result of changes in span length, or optical fiber composition, or as a result of an upgrade to the optical system through additionally populating the optical input signal to the optical amplifier with more or less channels of significantly increased or decreased spectral extent or spectral power density (e.g., moving from C-band to C-plus L-band operation or vice versa which is known to produce inter-band Raman gain and intra-band Raman gain).

If the optical amplifier is an Erbium doped amplifier, the optical filter may change the gain slope or shape of the Erbium doped amplifier in response to a change in the spectral signal content of the optical system that occurs as a result of variations of Erbium doped amplifier gain in the Erbium doped amplifier of the optical system. The Erbium doped amplifier gain may vary as a result of optical amplifier fiber length, or optical amplifier fiber composition, or as a result of an upgrade to the optical system through additionally populating the optical input signal to the Erbium doped amplifier with more or less channels of significantly increased or decreased spectral extent or spectral power density (e.g., moving from C-band to C-plus L-band operation or vice versa or from a low channel count to a high channel count or change in the channel power distribution as a result of an add/drop operation, which is known to produce gain intra-band and inter-band changes due to homogeneous saturation (population inversion changes) and inhomogeneous saturation (spectral hole burning).

While the optical filter of the present invention may be used to switch the gain shape between two or more defined spectral shapes using different gain slopes, the optical filter could be used to achieve any gain shape change with a simple wavelength shift of the filter spectral shape.

The optical filter of the present invention may be a multi-clad coupler based device, a planar waveguide based device, a fiber Bragg grating (FBG) based device, a fused bi-conic taper coupler based device, or a micro-optic device. Such a micro-optic device may include micro-lenses and birefringent crystals for providing splitting and recombination into the couplers. The phase accumulation, advance and retardation may be achieved using a class of electro-optic materials including, but not limited to, OPTOCERAMIC™ materials, and preferably PLZT materials, such as lead zircanate titanate.

The optical filter device preferably is implemented as a monolithic continuous unbroken optical path. The light never physically leaves the optical fibers, the light expands through couplers, however the device is monolithic, and there are no Fresnel discrete reflections, there are no substantially different optical materials, etc. This makes the device uniquely capable of handling high optical power. The device may have a significant advantage in 40 GB/s system because the Fresnel reflections that would otherwise be present, introduce insertion loss ripple that creates a group delay ripple effect. By eliminating these reflections, the inventive device does not suffer from the above-noted problems associated with such reflections.

As will be apparent to those skilled in the art, an optical filter in accordance with the present invention, may be constructed to compensate for anything that changes the gain spectrum of an optical device in a substantially systematic way that can be measured.

The optical filter of the present invention is suitable for high-bit rate (i.e., 40 GB/s) applications due to very low excess loss, return loss, PDL, PMD, IL, ripple, dispersion and group delay ripple, a continuously unbroken path (when implemented as a monolithic waveguide device), both C-band and L-band capability, and may be used for Raman applications.

The inventors have assembled programmable fiber optical filter according to present invention. This filter incorporates a Mach-Zehnder filter capable of providing gain slope changes. The Mach-Zehnder filter includes one or more interferometers that are fabricated using two optical fibers. These optical fibers are characterized by the cores that have different diameters and numerical apertures, such as disclosed in the article by D. A. Nolan and W. J. Miller, and entitled "Wavelength Tuned Mach-Zehnder Device," Optical Fiber Conference 1994, San Jose, Calif. This difference provides for two different optical paths, since the propagation constants of the cores are different. During the fabrication process, the fibers are mid-stripped of their plastic coatings and inserted into a glass tube. The tube has an index lower than that of silica. The tube containing the fibers is tapered twice in order to provide for two 3 dB couplers. The region between the couplers is about 4 cms long and is bent by about 100 microns in order to tune or move the center wavelength of the Mach-Zehnder filter so as to provide adjustments to amplifier gain slope (with respect to wavelength). The Mach-Zehnder filter is robust and environmentally stable. The total typical insertion loss of these Mach-Zehnder filters is on the order of 0.5 dB. The assembled Mach-Zehnder filter is mechanically stable. Wavelength tuning is achieved using a small dual-phase stepper motor to provide motion to tune the filter center wavelength and on optical potentiometer to provide position feedback. A small electronic driver provides motor control and amplifies the potentiometer signal. Control of the device can be managed by a simple increment/decrement of the stepper motor to control the center wavelength.

One advantage of the present invention is that it provides a method for compensating variations in the input power to the amplifier. An optical amplifier is optimized for certain input power corresponding to the highest loss in an optical fiber span of an optical system in which the optical amplifier is utilized. Particularly, the amplifier is designed to produce desired output power and the output spectrum that has adjustable spectral slope for certain input power. However, when the input power to the optical amplifier is higher due to decrease in the loss of the optical fiber span, it is expected that the total output power does not change significantly while spectral slope of the output is still adjustable. One problem that arises through the use of optical amplifiers and, in particular, EDFAs that utilize spectrally flat variable optical attenuator (VOA), is that when the input power is varied, it is not always possible to achieve desired constant output power with adjustable gain slope. That is, the gain slope can be changed dynamically, during the amplifier operation. The control of the amplifier with varying input power is complex because both the pump power and the VOA loss need to be adjusted. These adjustments need to simultaneously and depend on each other in order to achieve constant output power and desired gain slope of the output of the optical amplifier. When the improved optical filter according to the present invention is utilized instead of the VOA, the amplifier control is simplified, as described below.

Figure 17A:
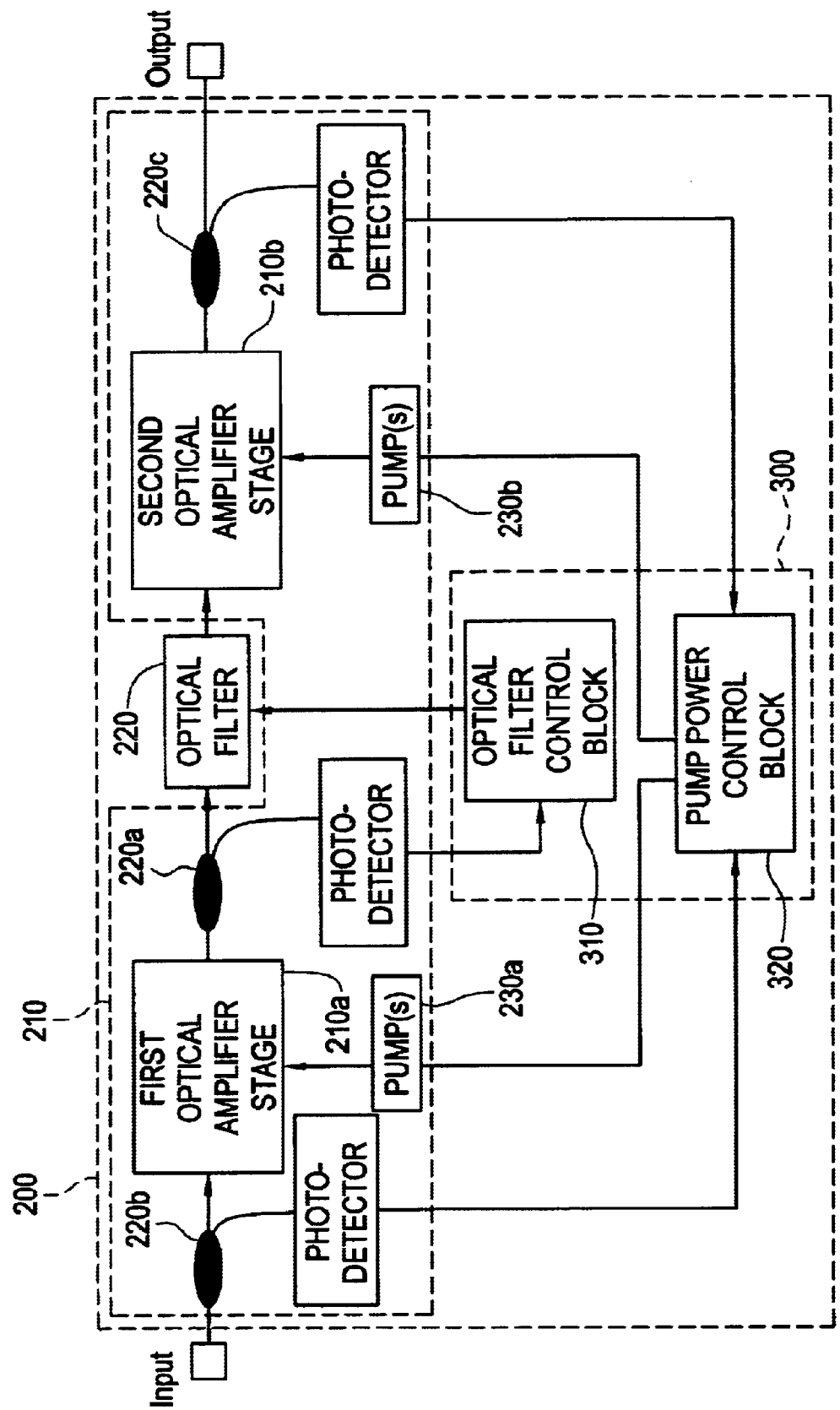
FIG. 17A is a block diagram of an optical amplifier system of another embodiment of the present invention.
Figure 17B:
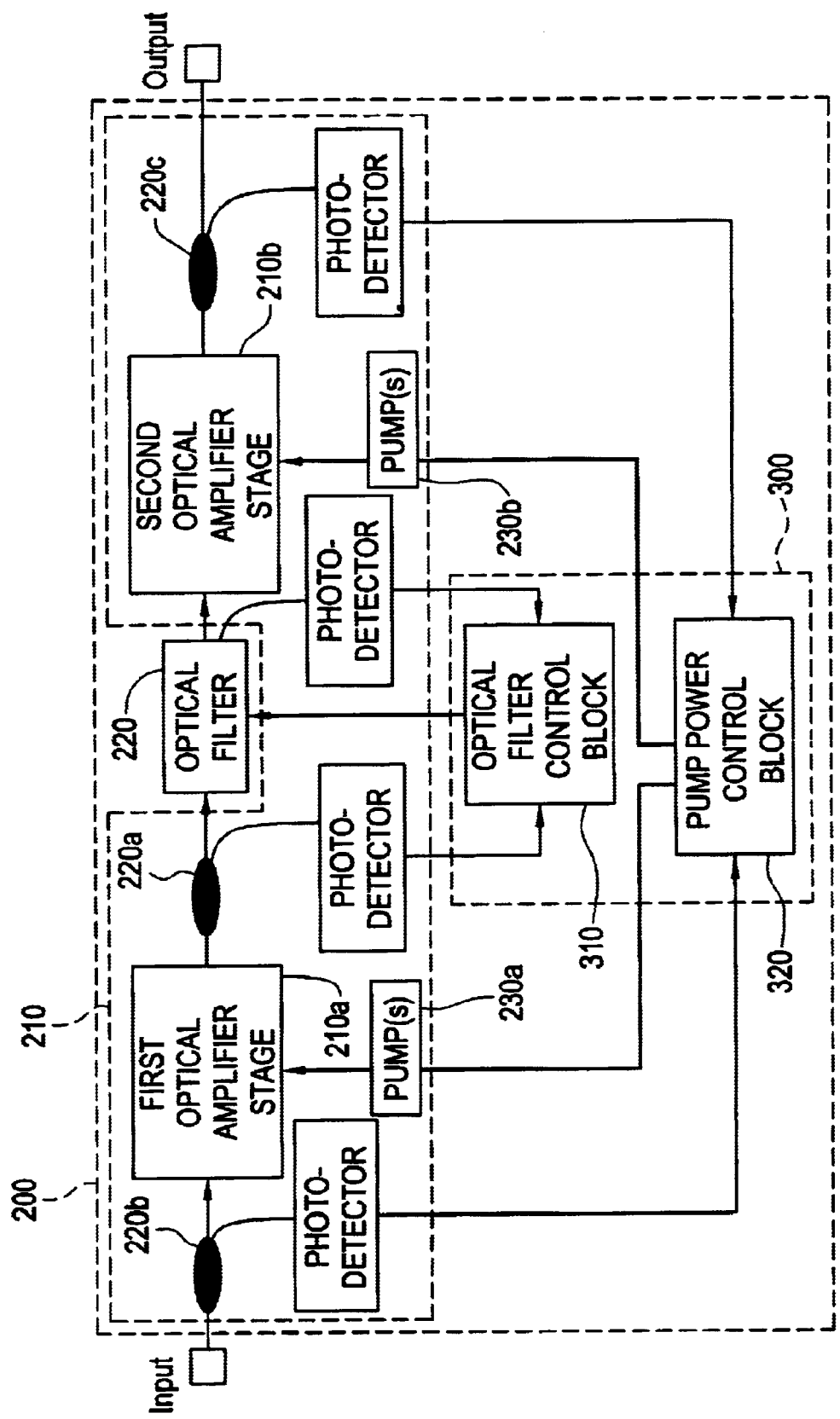
FIG. 17B is a block diagram of an optical amplifier system, which includes an embodiment of an optical filter that comprises Mach-Zehender filter.

FIG. 17 shows an illustrative optical amplifier system and amplifier control circuit block 200, constructed in accordance with the another embodiment of present invention. As shown, optical amplifier system 200 includes an optical amplifier 210 and an improved optical filter 220. Optical amplifier 210 includes a first stage 210a and a second stage 210b each including an amplifying medium, such as Erbium doped fiber coil coupled to at least one optical pump. Optical filter 220 is preferably coupled between amplifier stages 210a and 210b and preferably has pseudo-parabolic insertion loss as shown in FIG. 4a. The amplifier control circuit block 300 includes control circuit block 310 for controlling the optical filter 220 and pump power control circuit block 320 for the controlling optical pump(s) 230a and 230b. The input to the control circuit block 310 is obtained through the photodetector reading optical signal power through the tap 220a. The tap 220a is preferably placed in the optical path in front of the input end of the optical filter 220. An additional optical tap and its associated photodetector may be located near the output end of the optical filter 220 and may provide additional input to the optical filter control block 310. The input to the pump power control circuit block 320 is obtained through the photodetectors that read optical power through taps 220b and 220c. The taps 220a, 220c are placed, preferably, near the input and the output ports of optical amplifier 210.

The input power to the amplifier 200 will generally be higher than the designed input power because the amplifier 200 is designed for the lowest expected input power. In order to set the center wavelength of the optical filter and thus to set the desired gain slope of the output spectrum, control circuit block 310 utilizes only the input from the photodetector attached to the tap 220a and look-up table. When optical input signal power is larger than the designed optical power, the output signal power of the amplifier does not vary significantly with variations in the input power. Thus, it is not necessary to adjust the pump power through the control circuit block 320. This was illustrated in FIGS. 14A–14B. More specifically, these figures show that the output power did not vary significantly when the input power was higher than the designed input power for the amplifier. Thus, constant output power and different slopes at output can be achieved through control of a single parameter, namely the center wavelength of the optical filter according to the present invention with pseudo-parabolic spectral filter function. The pump power is kept fixed and does not need to be adjusted to restore output signal power from the optical amplifier system 200. The control of the optical filter 220 and the pump power work independently and control of the whole amplifier is greatly simplified.

Figure 18:
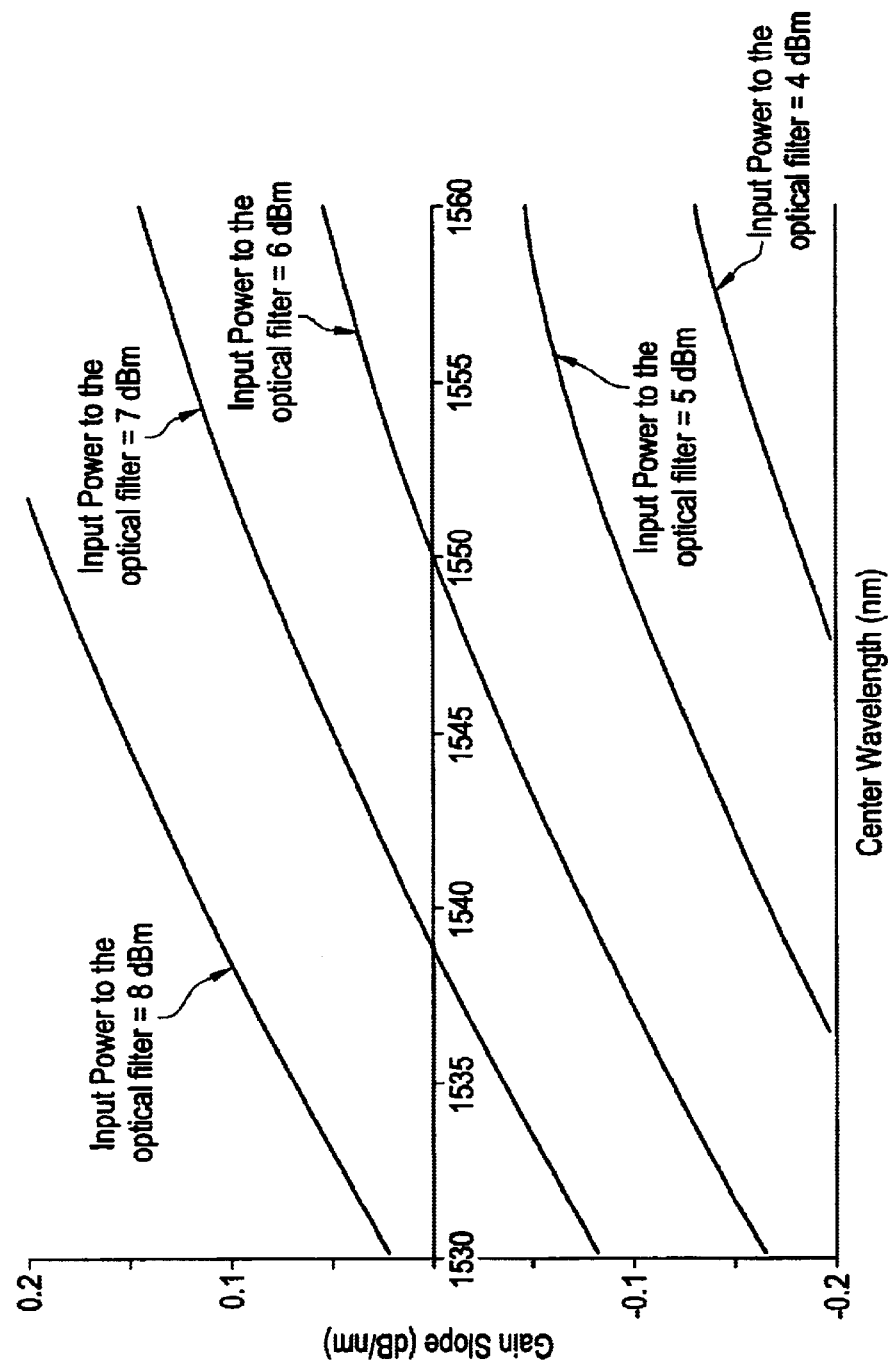
FIG. 18 illustrates, in a graphical manner, an exemplary look up table utilized in the device of FIG. 17A.

FIG. 18 shows an example of lookup table, in a graphical form. For each input signal power to the optical filter, required the center wavelength shift can be uniquely determined for a given signal slope at the output of the optical system 200. The lookup table can be derived by including each conceived case of the input signal power, desired signal tilt. Most specifically, FIG. 18 depicts five curves each corresponding to a different input signal powers. In this example, input signal powers vary from 4 dBm to 8 dBm. Other input signal powers may be utilized. FIG. 18 shows the required center wavelength shift for desired signal tilt at the output for various input powers to the optical filter 220. Although FIG. 18 depicts center wavelengths from 1530 nm to 1560 nm, other center wavelengths may also be used.

In another embodiment of the invention, the optical filter with pseudo-parabolic spectral filter function is a fiber based Mach-Zehender filter. The Mach-Zehender filter has two outputs. Most of the optical signal light will be provided to one of the outputs after it is processed by the filter and routed to the second optical amplifier stage 210b. Zehender filter may be used for (i) predicting the output from the optical system 200, or (ii) predicting the input (if the tap 220a is absent or if its associated detector is not functional)) to Mach-Zehender filter, or (iii) to monitor the output from the Mach-Zehender filter. The optical power provided by the second output of Mach-Zehender filter is given by:

$$OP_2 = P_{in} - OP_1 - ExIL,$$

where
$OP_2$ is the Optical Power of Second Output, $P_{in}$ is the Optical Signal Input Power to the Mach-Zehender filter, $OP_1$ is the Optical Power of First Output, ExIL is the excess loss from the Mach-Zehender filter. To determine ExIL, one measures initial optical signal input power ($P_{in}$) to the filter and the initial optical signal output powers ($OP_1$, $OP_2$) from both outputs from the Mach-Zehender filter.

From the initial measurements one also determines the amount of the optical signal power loss from input to the Mach-Zehender filter to the first output and to the second output. The output spectrum or total power from the first output of the Mach-Zehender filter can then be determined if the spectrum or the output power from the second output of the Mach-Zehender filter is known. This is shown in the following equation.

$OP_1 = OP_2 * IL_{in\text{-}O2}/IL_{in\text{-}O1}$, where $IL_{in\text{-}O1}$ is the insertion loss from input of the Mach-Zehender filter to its first output and $IL_{in\text{-}O2}$ is the insertion loss from input of the Mach-Zehender filter to its second output. Therefore, once the value of $OP_2$ is known, we can predict the value of $OP_1$. The optical signal power value from the first output ($OP_1$), derived from the above equation, can be corrected for the excess loss (ExIL) from the Mach-Zehender filter. Thus, by measuring the output from the second output of the Mach-Zehender filter, we can predict the output from the first output (of the Mach-Zehender filter) that is provided to the second optical amplifier stage 210b.

Figure 19:
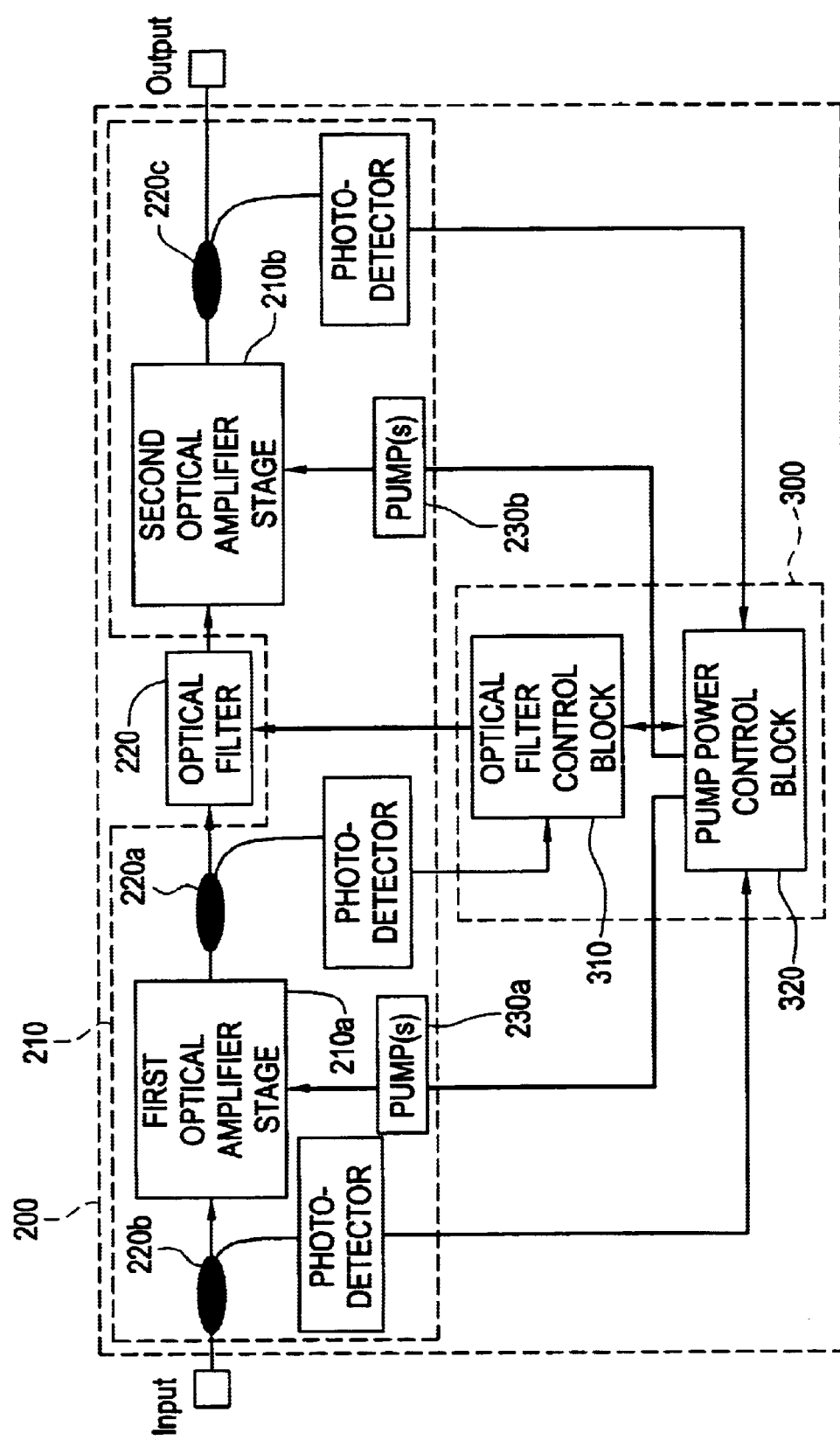
FIG. 19 is a block diagram of another embodiment of the present invention.

FIG. 19 illustrates another optical amplifier system 200, which is similar to that illustrated in FIG. 17. The optical amplifier system of FIG. 19 utilizes the amplifier control circuit block 300 which includes the optical filter control block 310 and pump power control block 320. The control blocks 310 and 320 work dependently and/or simultaneously in selective cases as described below. They also share information as needed. In this embodiment, the optical amplifier 210 is optimized for certain input power corresponding to the typical loss in an optical transmission fiber span (of an optical transmission system in which the optical amplifier 210 is utilized). Hence, the optical amplifier 210 experiences optical signal input power excursions in both directions, i.e.—higher and lower than the designed optical signal input power. When the optical signal input power is higher than the designed optical signal input power, the control blocks 310 and 320 do not need to work dependently or simultaneously. The constant optical signal output power and different gain slopes at output can be achieved through control of a single parameter, namely the center wavelength of the optical filter according to present invention which has a pseudo-parabolic spectral filter function. The optical pump power does not need to be adjusted to restore the optical signal output power provided by the optical system 200. Only when the input power is lower than the designed optical signal input power the control block 310 and 320 work dependently and/or simultaneously. The optical filter control block 310 then needs the information about the optical signal input power from the photodetector associated with optical signal 220b. The pump power control blocks sends signal to pumps 230a and 230b to provide more pump power, which would result in higher output power from the optical amplifier system 200.

Figure 20:
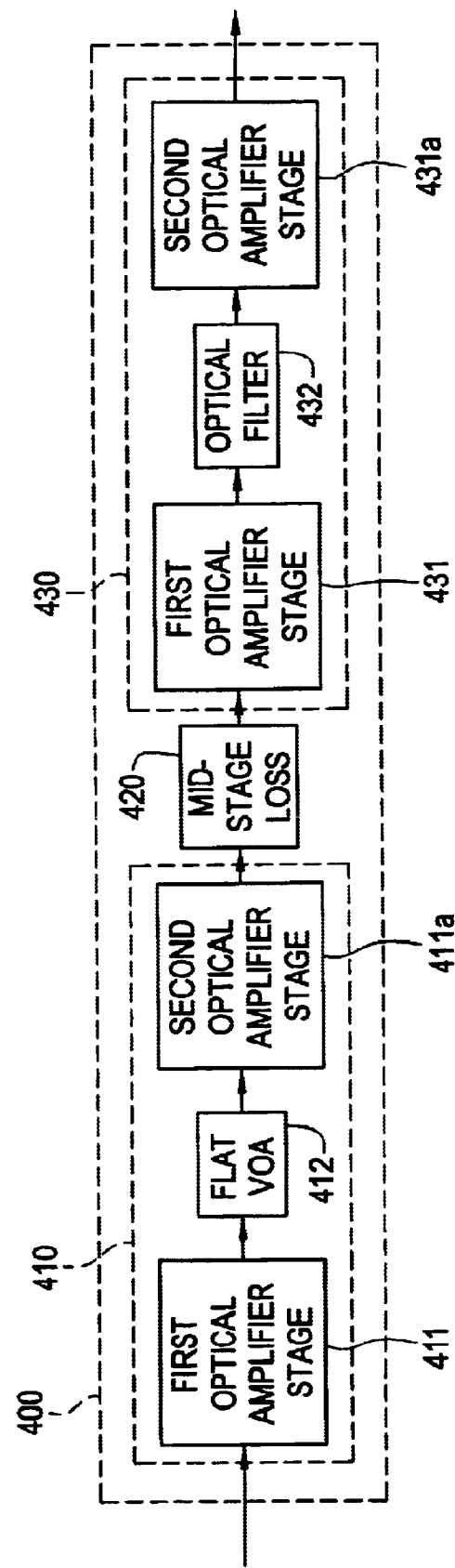
FIG. 20 is a block diagram of an optical amplifier system of yet another embodiment of the present invention.
Figure 21B:
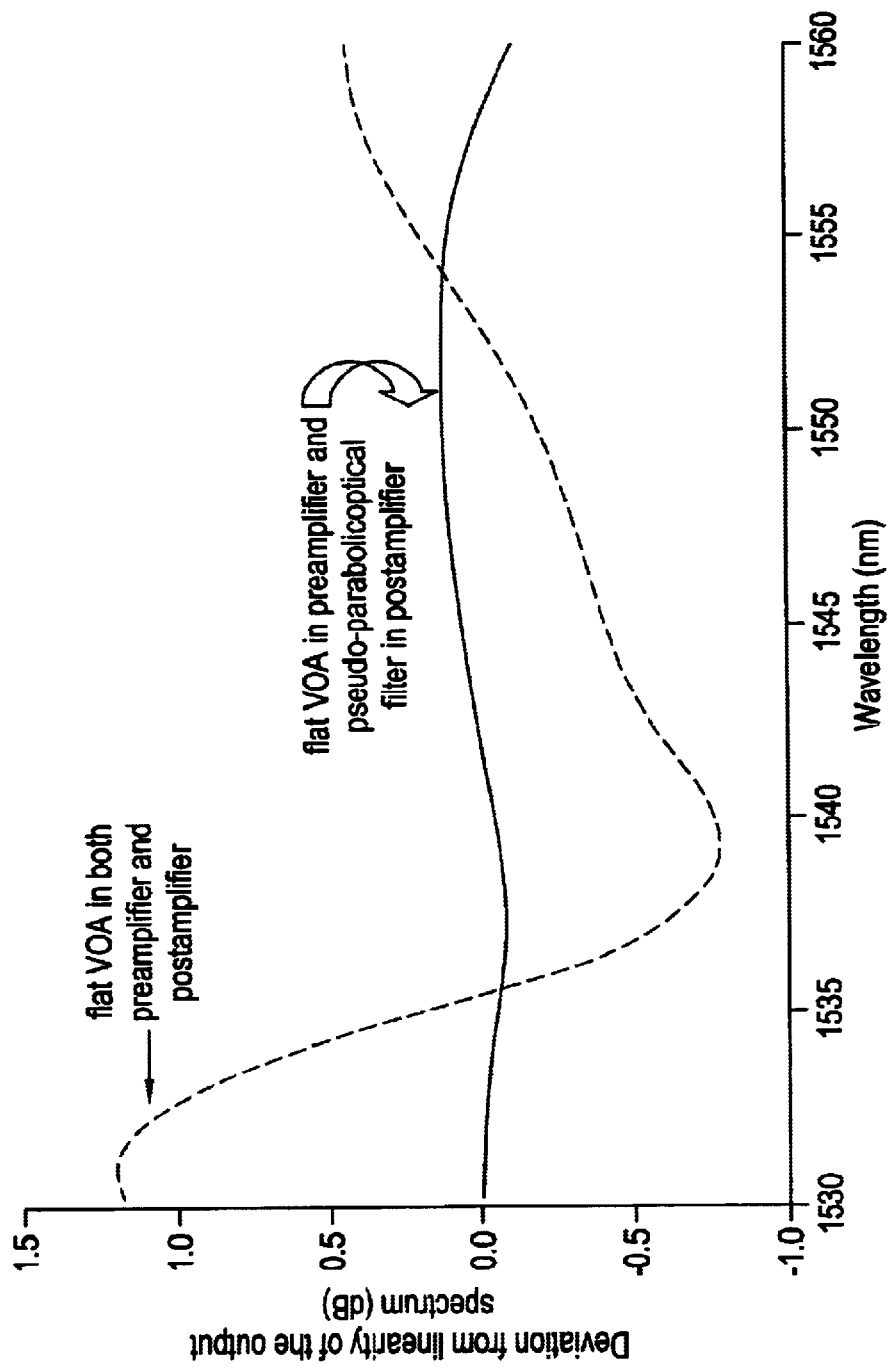
FIG. 21B depicts deviation from linearity of the output spectrum versus wavelength for the two optical amplifiers.

FIG. 20 illustrates another optical amplifier system 400 that includes an optical filter according to the present invention. The amplifier system 400 includes a preamplifier 410, a midstage loss unit 420 and a postamplifier 430. The midstage loss unit 420 may be a dispersion compensation module and/or a add-drop multiplexer, or any other component that results in optical power loss to the signal. The preamplifier and the postamplifier both include at least one optical amplification stage. In the FIG. 20, both preamplifier and postamplifier are shown to have two optical amplification stages, 411a, 411b and 431a 431b, respectively. A flat VOA 412 and an optical filter 432 with pseudo-parabolic spectral filter function are included in the preamplifier and postamplifier respectively. The flat VOA 412 and the optical filter 432 may be placed before, after, or between the amplifier stages in either preamplifier, postamplifer, or both preamplifier and postamplifier. The preamplifier and the postamplifier are each controlled individually as described in FIGS. 17 and 19 or by any other method. With all the arrangements described above it is possible to accommodate input power variations and produce desired output power. However, in the arrangement described herein, namely inclusion of the flat VOA in the preamplifier and the inclusion of the optical filter with the pseudo-parabolic optical filter function in the postamplifier, produces less noise figure impact and less deviation from linearity in the optical output spectrum when compared to the other configurations. FIG. 21A shows the noise figure comparison for the worst case input power between the flat VOA and optical filter arrangement described here and the case where flat VOA is used in both preamplifier and postamplifier. FIG. 21B shows the deviation from linearity for the same two cases as in FIG. 21A. The preferred arrangement described here has lower noise figure and smaller deviation from linearity compared to other case.

It will become apparent to those skilled in the art that various modifications to the preferred embodiment of the invention as described herein can be made without departing from the spirit or scope of the invention as defined by the appended claims.

What is claimed:

1. An optical device having an optical input and output, said optical device comprising:
    (a) an optical amplifier with at least one amplifying stage;
    (b) optical pumps coupled to and providing optical pump power to said at least one amplifying stage, so as to produce gain in the said optical amplifier;
    (c) a tunable optical filter coupled to said optical amplifier, said optical filter changing (i) only gain slope of the said optical amplifier, in response to change in only a single parameter of the said optical filter, and (ii) insertion loss slope with wavelength, but not significantly changing the shape of the insertion loss;
    (d) at least one controller adjusting said single parameter of said optical filter and controlling said optical pumps.

2. An optical device according to claim 1, further comprising:
    a plurality of optical taps, at least one of said optical taps being positioned proximate to the input port of said optical amplifier and at least another one at least one of said taps being positioned proximate to the output port of said optical amplifier;
    a plurality of photodetectors connected to said controller, one of each of said photodetectors being coupled to a corresponding one of said plurality of optical taps;
    at least one additional optical tap, said additional optical tap being positioned proximate to said tunable optical filter; and
    at least one additional photodetector coupled to said additional optical tap and to said controller.

3. An optical device according to claim 1, wherein said at least one controller includes:
    (i) a first controller, said first controller changing gain slope of the said amplifier without causing change in the output signal power of the amplifier, by adjusting a single parameter of the said optical filter; and
    (ii) a second controller for said optical pumps, said second controller maintaining the optical pump power at the specified level; and
    wherein said first controller unit and said second controller do not exchange information.

4. An optical device according to claim 2, wherein said at least one controller includes:
    (i) a first controller for said tunable optical filter, said tunable optical filter utilizing input from said additional photodetector, said first controller changing the gain slope of the said amplifier without causing change in the output signal power of the amplifier, by adjusting a single parameter of the said optical filter; and
    (ii) a second controller controlling said optical pumps, said second controller utilizing inputs from photodetectors positioned proximately to the input and output ports of the optical amplifier, and the second controller maintaining the optical pump power at the specified level; and
    wherein said first controller unit and said second controller do not exchange information.

5. The optical device of claim 1, wherein said tunable optical filter is positioned in a location selected from being: in front, between or after said at least one amplifier stage.

6. The optical device of claim 1, wherein:
    (a) said optical amplifier includes a first amplifier stage and a second amplifier stage; and (b) said tunable optical filter includes a fiber based Mach-Zehnder filter, said Mach-Zehnder filter including a first output coupled to said second amplifier stage and a second output coupled to a photodetector, wherein said photodetector is coupled to said at least one controller.

7. The optical amplifier of claim 2 wherein, (a) said optical amplifier is designed to accommodate average expected optical signal input power corresponding to a span loss of a preceding optical transmission fiber;

(b) said amplifier including a plurality of amplifying stages; and (c) said at least one controller includes a first controller and a second controller, said first controller changing gain slope of the said amplifier without causing change in the output signal power of the amplifier, by adjusting a single parameter of the said optical filter; said second controller controlling said optical pumps and maintaining the optical pump power at the specified level;

said first controller utilizing input from said additional photodetector and said second controller utilizing input from said plurality of the photodetectors; wherein said first and the second controllers do not exchange information when the input signal power is higher or equal to the average expected input signal power, while gain slope is being changed; and when input power is lower than the average expected input signal power, said first and said second controllers exchange information to maintain optical signal output power, while gain slope is being changed.

8. The optical amplifier of claim 7 wherein said optical filter is being located ether in front of any of said gain stages, between any two of said gain stages, or downstream of any of said gain stages.

9. The optical device of claim 1, wherein said tunable optical filter has polarization mode dispersion is less than 0.05 ps.

10. The optical device of claim 1, wherein said tunable optical filter has a pseudo-parabolic insertion loss function, when measured in dB.

11. The optical device of claim 1, wherein said optical filter is a Mach-Zehnder interferometer and the single parameter that is changed is a relative phase accumulation between two arms of said Mach-Zehnder interferometer.

12. The optical device of claim 1, wherein the single parameter is varied as a function of temperature such that said tunable optical filter compensates for variations in the gain spectrum of said optical amplifier that occur as a function of operating temperature.

13. The optical device of claim 1, wherein said optical filter has a spectral filter function that is substantially symmetric about the central wavelength.

14. The optical device of claim 1, wherein said optical filter changes the gain slope or shape of said optical amplifier in response to a change in the input spectral signal content that occurs as a result of variations of loss in an optical fiber span of an optical system in which the optical amplifier is utilized.

15. The optical device of claim 1, wherein said tunable optical filter is at least partially implemented using a multi-clad waveguide.

16. The optical device of claim 1, wherein said tunable optical filter is at least partially implemented in a planar waveguide.

17. The optical device of claim 1, wherein said tunable optical filter is at least partially implemented as a dielectric stack filter with fixed layer thickness without an air gap and with fixed layer thicknesses.

18. The optical device of claim 1, wherein said tunable optical filter is utilized when optical input signal power to said tunable optical filter is at least 300 mW.

19. The optical device of claim 1, wherein said tunable optical filter has polarization dependent loss that does not increase more than 0.01 dB for 1 dB of average insertion loss increase.

20. The optical device of claim 1, wherein said tunable optical filter has polarization mode dispersion is less than 0.05 ps, preferably less than 0.02 ps and more preferably less than 0.01 ps.

21. The optical device of claim 1, wherein said tunable optical filter has spectral filter function such that the amplifier gain spectrum linearity W/G is less than 6%, where W is peak to peak variation from best fit line approximation to optical gain spectrum and G is average optical gain.

22. An optical transmission system for transmitting optical signals, said system comprising:

(a) a length of optical transmission fiber providing dispersion penalty and span loss to the propagating optical signal;

(b) an optical amplifier providing gain spectrum characterized by variable gain slope, said optical amplifier including i. a preamplifier compensating for the span loss introduced by said transmission fiber, said preamplifier being coupled to said transmission fiber;

ii. a midstage loss element compensating for the dispersion penalty and providing midstage loss;

iii. a postamplifier to compensate for the span loss and midstage loss; and iv. only one tunable optical filter, said one optical filter changing the gain slope of said optical amplifier in response to a change in only a single parameter of said optical filter, said filter having insertion loss slope which is not constant with wavelength change and insertion loss shape which is constant, wherein said tunable filter does not compensate for changes in gain shape.

23. The optical transmission system of 22, wherein said preamplifier includes a flat VOA and said postamplifier includes said tunable optical filter.

24. The optical transmission system of 22, wherein said preamplifier includes a flat VOA and one tunable optical filter; and said postamplifier includes another VOA and another tunable optical filter.

25. The optical transmission system of 22, wherein said preamplifier includes said tunable optical filter and said postamplifier includes a flat VOA.

26. The optical device of claim 21, wherein said gain spectrum linearity W/G is less than 4%.

27. The optical device of claim 26, wherein said gain spectrum linearity W/G is less than 2%.

28. The optical device of claim 9, wherein said tunable optical filter has polarization mode dispersion is less than 0.02 ps.

29. The optical device of claim 28, wherein said tunable optical filter has polarization mode dispersion is less than 0.01 ps.

* * * * *